US011830358B1

(12) United States Patent
Sudhir et al.

(10) Patent No.: US 11,830,358 B1
(45) Date of Patent: Nov. 28, 2023

(54) METHOD AND APPARATUS FOR DETECTING SUSPICIOUS DEVICE/VEHICLE PRESENCE ON NON-NAVIGABLE ROADS

(71) Applicant: HERE Global B.V., Eindhoven (NL)

(72) Inventors: Rahul Sudhir, Mumbai (IN); Bhavesh Sharma, Mumbai (IN); Donta White, Racine, WI (US)

(73) Assignee: HERE GLOBAL B.V., Eindhoven (NL)

( * ) Notice: Subject to any disclaimer, the term of this patent is extended or adjusted under 35 U.S.C. 154(b) by 7 days.

(21) Appl. No.: 17/737,523

(22) Filed: May 5, 2022

(51) Int. Cl.
*G08G 1/123* (2006.01)
*G08G 1/01* (2006.01)
*G01C 21/36* (2006.01)

(52) U.S. Cl.
CPC ....... *G08G 1/0112* (2013.01); *G01C 21/3697* (2013.01)

(58) Field of Classification Search
CPC .................. G08G 1/0112; G01C 21/3697
See application file for complete search history.

(56) References Cited

U.S. PATENT DOCUMENTS

| 7,119,696 | B2 | 10/2006 | Borugian | |
|---|---|---|---|---|
| 7,439,847 | B2 | 10/2008 | Pederson | |
| 8,620,571 | B2 | 12/2013 | Konishi | |
| 10,484,815 | B1* | 11/2019 | Smith | H04W 4/021 |
| 2008/0183344 | A1 | 7/2008 | Doyen et al. | |
| 2012/0150966 | A1* | 6/2012 | Fan | G06Q 10/107 |
| | | | | 709/206 |
| 2016/0036558 | A1* | 2/2016 | Ibrahim | H04W 4/44 |
| | | | | 455/297 |
| 2021/0107530 | A1* | 4/2021 | Buerkle | G08G 1/20 |

FOREIGN PATENT DOCUMENTS

| CN | 103473929 A | | 12/2013 |
|---|---|---|---|
| JP | 2015179333 | * | 3/2014 |

* cited by examiner

*Primary Examiner* — Hongmin Fan
(74) *Attorney, Agent, or Firm* — John J. McKearin; HERE GLOBAL B.V.

(57) ABSTRACT

An approach is provided for automatically detecting suspicious device/vehicle presence on non-navigable roads. The approach involves, for example, receiving positioning data associated with a vehicle or a device. The approach also involves processing the positioning data to determine that a location of the vehicle or the device is on a non-navigable road. The approach further involves designating the location on the non-navigable road as a suspicious location. The approach further involves providing an alert message based on the suspicious location as an output.

20 Claims, 17 Drawing Sheets

100

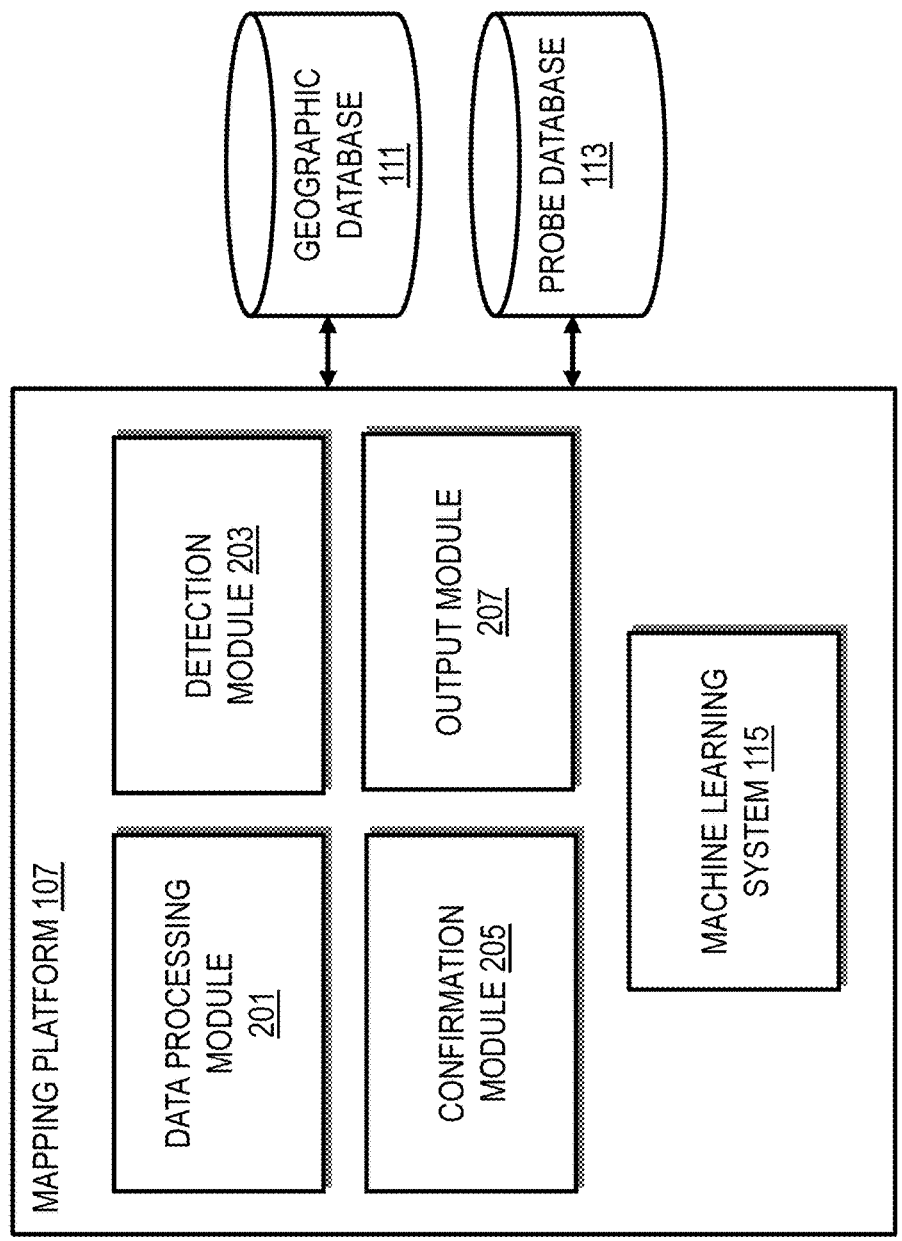

300

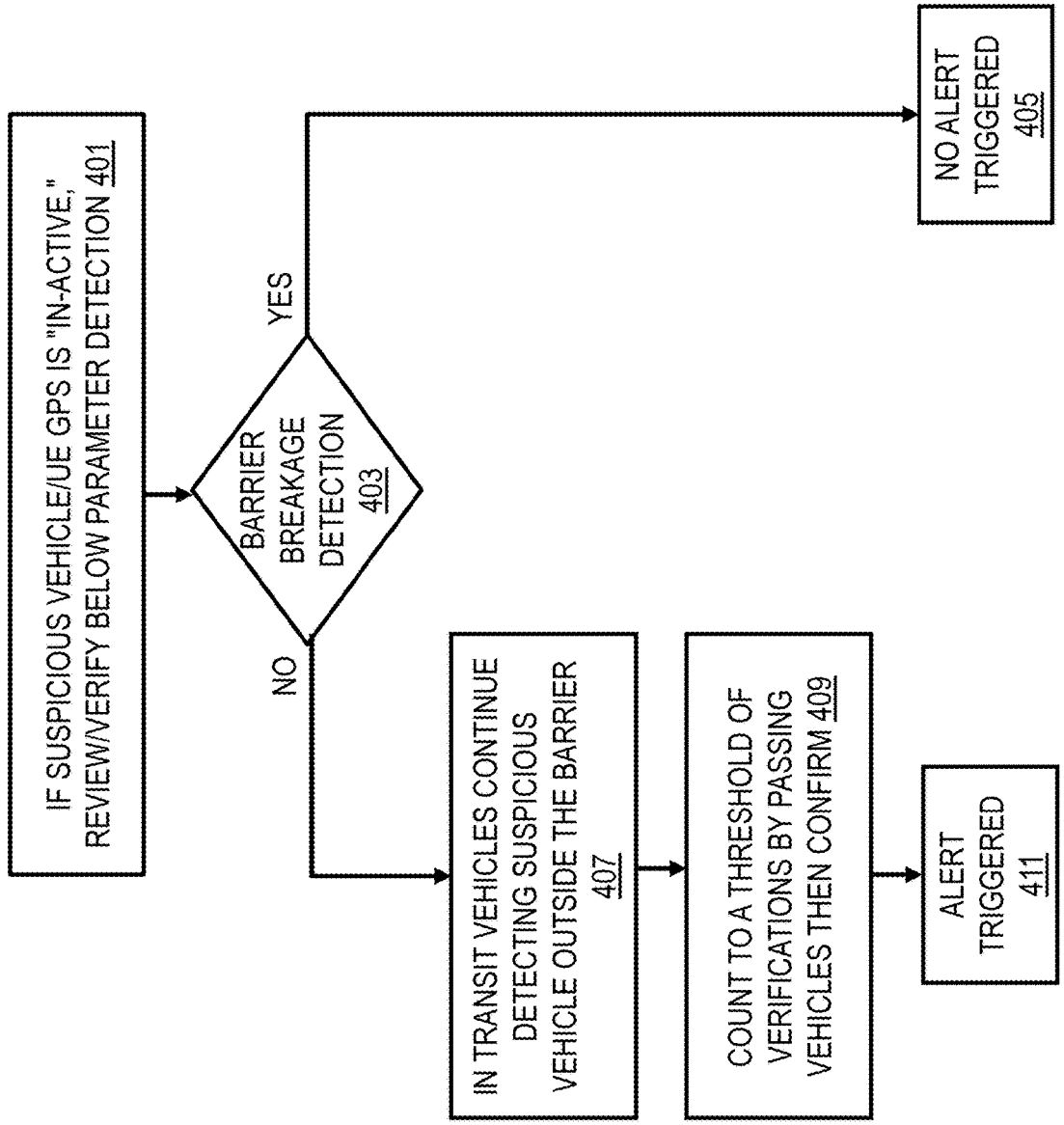

400

500

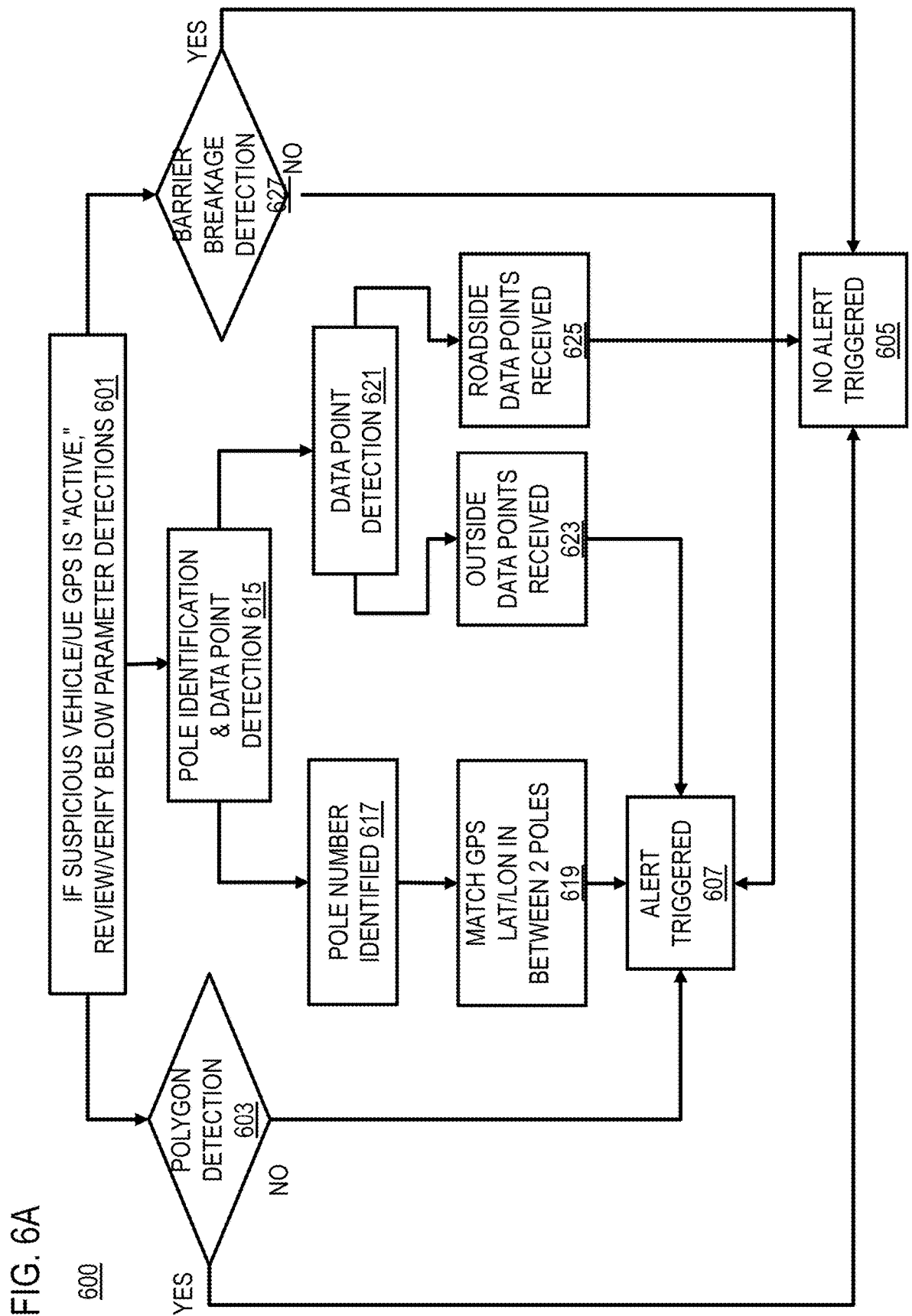

METHOD AND APPARATUS FOR DETECTING SUSPICIOUS DEVICE/VEHICLE PRESENCE ON NON-NAVIGABLE ROADS

BACKGROUND

Navigation and mapping service providers are continually challenged to provide digital maps with traffic incident reports to support navigation applications and roadway restricted area enforcement. For example, providing up-to-date data on traffic flow and traffic incidents (e.g., accidents or bottlenecks) to the authorities can potentially reduce congestion and improve roadway safety. One area of interest is to detect and report suspicious activities (e.g., drug/human trafficking, illegal gathering/gambling, etc.) in the proximity of a roadway. Vehicle/device probe data and/or location sensor data may reveal when vehicles or user devices deviate from a defined road network. However, such probe/sensor data may be unavailable, e.g., manually turned off by users who plan to engage in suspicious activities. Although some mobile applications allow users to manually report map issues, gas prices and types, closure, hazard, traffic jam, police presence, crash, roadside help request, etc., there is no automatic detection and reporting of suspicious activities near roadways. Therefore, map service providers face significant technical challenges to automatically detect such suspicious activities near roadways and/or non-navigable roads (NNRs).

SOME EXAMPLE EMBODIMENTS

As a result, there is a need for automatically detecting suspicious device/vehicle presence on non-navigable roads.

According to example embodiment(s), a method comprises receiving positioning data associated with a vehicle or a device. The method also comprises processing the positioning data to determine that a location of the vehicle or the device is on a non-navigable road. The method further comprises designating the location on the non-navigable road as a suspicious location. The method further comprises providing an alert message based on the suspicious location as an output.

According to another embodiment, an apparatus comprises at least one processor, and at least one memory including computer program code for one or more computer programs, the at least one memory and the computer program code configured to, with the at least one processor, cause, at least in part, the apparatus to receive sensor data from at least one vehicle traveling on a road. The apparatus is also caused to process the sensor data to detect that another vehicle has exited the road at an exit point. The apparatus is further caused to designate that the another vehicle is engaged in a suspicious activity based on determining that the exit point is not recorded as an exit in a geographic database. The apparatus is further caused to provide an alert message based on the suspicious activity as an output.

According to another embodiment, a computer program product may be provided. For example, a computer program product comprising instructions which, when the program is executed by a computer, cause the computer to determine a location at which a vehicle or a device has manually turned off a positioning sensor of the vehicle or the device. The computer is also caused to query a geographic database to determine that the location is on a non-navigable road. The computer is further caused to designate the location on the non-navigable road as a suspicious location. The computer is further caused to provide an alert message based on the suspicious location as an output. In other embodiments, the instructions can cause the computer to carry out other steps described herein.

According to another embodiment, a non-transitory computer-readable storage medium carries one or more sequences of one or more instructions which, when executed by one or more processors, cause, at least in part, an apparatus to determine a location at which a vehicle or a device has manually turned off a positioning sensor of the vehicle or the device. The apparatus is also caused to query a geographic database to determine that the location is on a non-navigable road. The apparatus is further caused to designate the location on the non-navigable road as a suspicious location. The apparatus is further caused to provide an alert message based on the suspicious location as an output.

According to another embodiment, an apparatus comprises means for receiving sensor data from at least one vehicle traveling on a road. The apparatus also comprises means for processing the sensor data to detect that another vehicle has exited the road at an exit point. The apparatus further comprises means for designating that the another vehicle is engaged in a suspicious activity based on determining that the exit point is not recorded as an exit in a geographic database. The apparatus further comprises means for providing an alert message based on the suspicious activity as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of the components of a mapping platform, according to example embodiment(s);

FIGS. 4A-4B is a flowchart of an inactive mode for automatically detecting suspicious device/vehicle presence on non-navigable roads, according to example embodiment(s);

FIGS. 6A-6B is a flowchart of a turn-off mode for automatically detecting suspicious device/vehicle presence on non-navigable roads, according to example embodiment(s);

DESCRIPTION OF SOME EMBODIMENTS

Examples of a method, apparatus, and computer program for automatically detecting suspicious device/vehicle presence on non-navigable roads. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
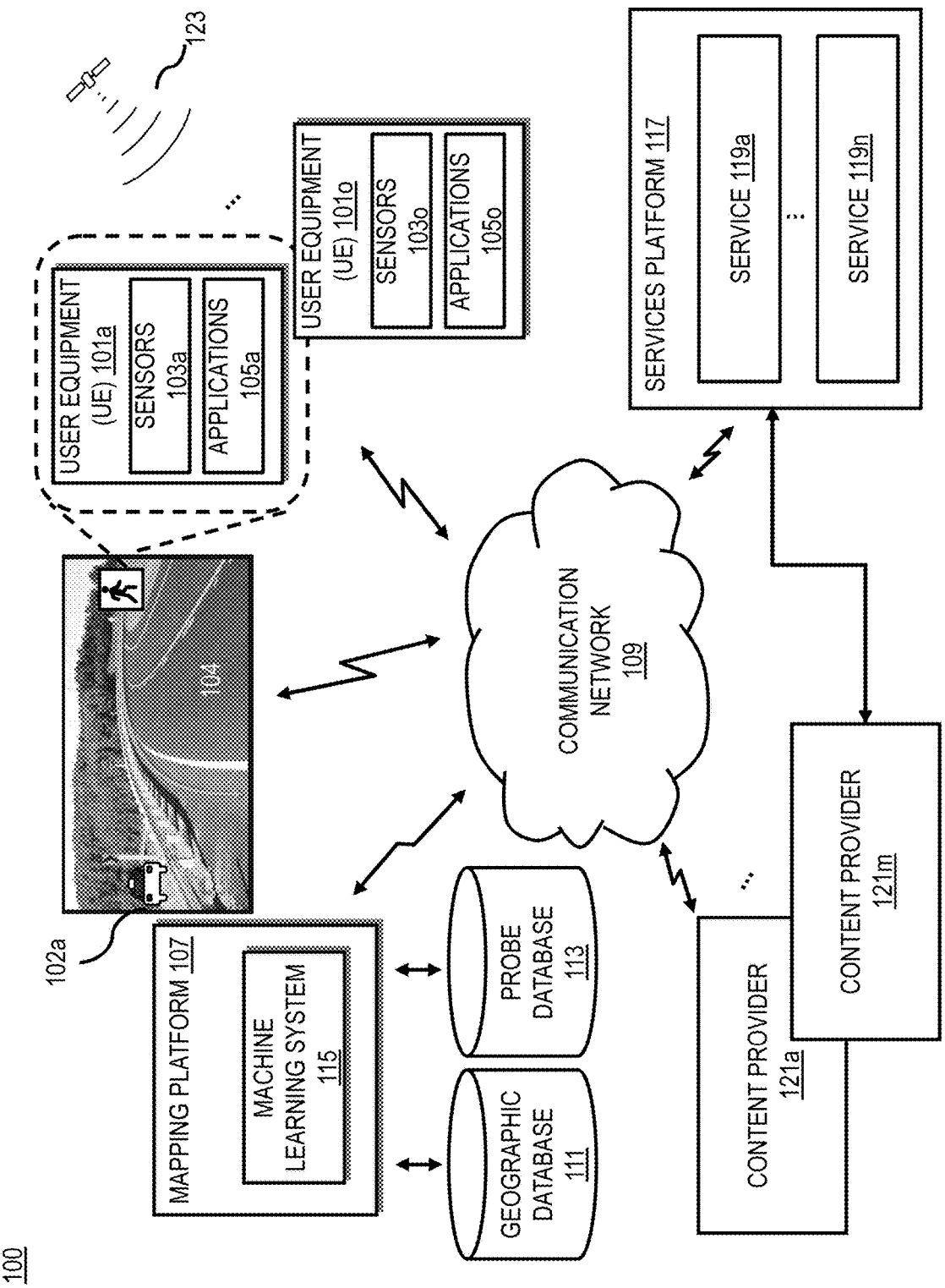
FIG. 1A is a diagram of a system capable of automatically detecting suspicious device/vehicle presence on non-navigable roads, according to example embodiment(s)
Figure 1B:
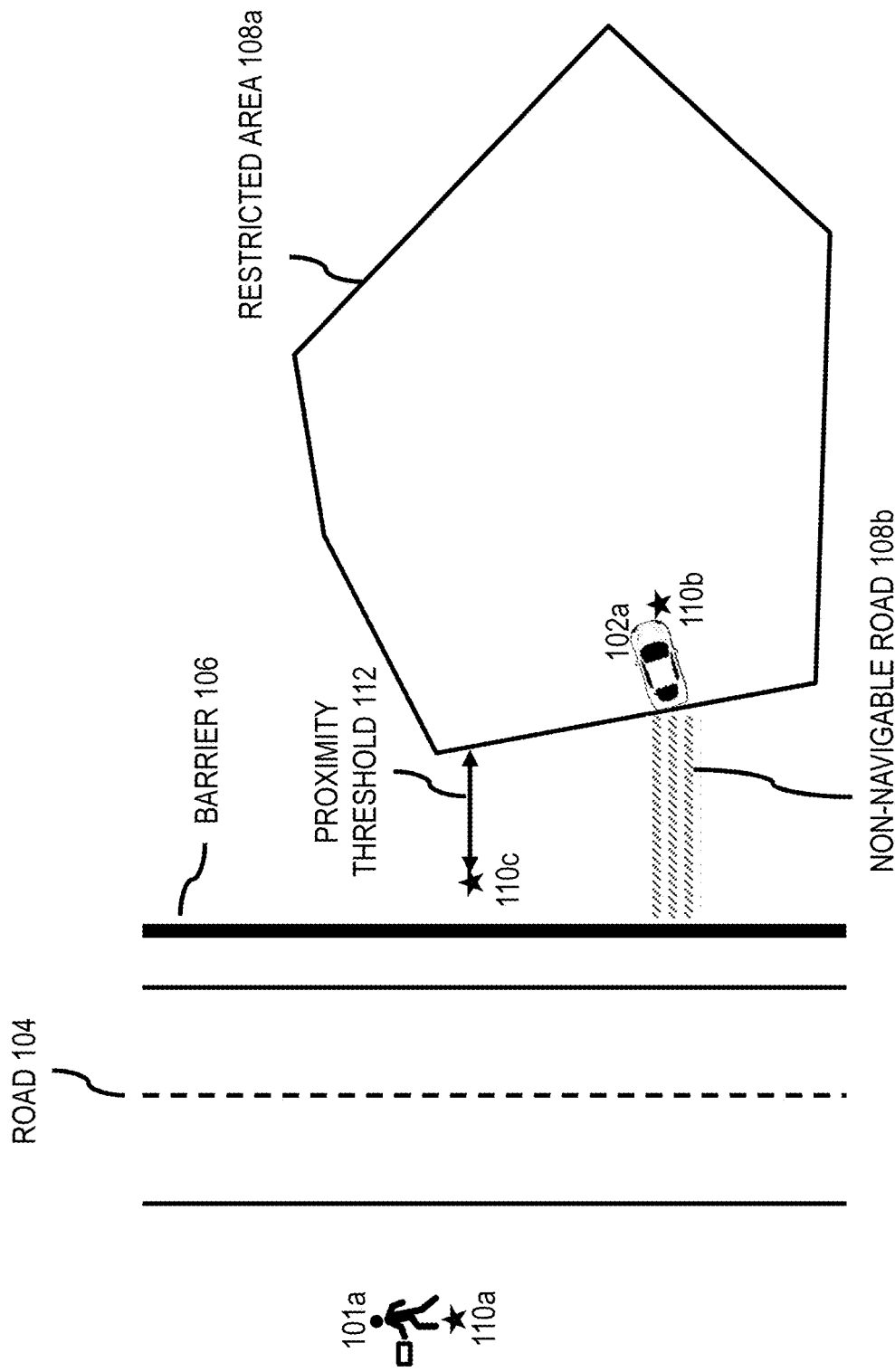
FIG. 1B is a diagram illustrating example suspicious presence events, according to example embodiment(s)

FIG. 1A is a diagram of a system 100 capable of automatically detecting suspicious device/vehicle presence on non-navigable roads, according to example embodiment(s). Map service providers can purchase probe data and/or location sensor data from data providers to build maps and create traffic products, etc. FIG. 1B is a diagram illustrating example suspicious presence events, according to example embodiment(s). In FIG. 1B, a road 104 has a center line, two edge line, and a barrier 106 (e.g., a guardrail). For instance, a user carrying a user equipment (UE) 101a walks into a restricted area 110a, e.g., an off-road area (e.g., grassland, gravel ground, etc.) along the road 104. As another instance, a vehicle 102a somehow exits from the road 104 and traverses into a restricted area 108a (e.g., another off-road area) via an NNR 108b. To create a suspicious presence report, the map service providers can map-match probe data (e.g., a vehicle probe trajectory) and/or location sensor data of the UE/vehicle, determine a respective location of the probe (e.g., the vehicle 102a), and determine a suspicious presence in a restricted area and/or NNR when the probe deviates from a defined road network and get to a suspicious location.

However, as mentioned, such probe/sensor data may be unavailable, e.g., manually turned off by users (e.g., the user of the UE 101a, a driver of the vehicle 102a, etc.) who plan to engage in suspicious activities (e.g., drug/human trafficking, illegal gathering/gambling, etc.). As mentioned, some mobile applications may only allow users to manually report map issues (e.g., general map error, incorrect turn, incorrect address, speed limit, incorrect route, missing roundabout or missing road), gas prices and types, closure (due to a hazard, construction or event), hazard (on road, shoulder, weather (e.g., unplowed road, fog, hail, flood, ice)), traffic jam (moderate, heavy, standstill), police presence, crash (minor, major or other side), roadside help (out of gas, flat tire, battery issue, medical issue, other), etc. There is no automatic detection and reporting of a suspicious vehicle/device presence near roadways that can signal illegal or prohibited activities.

To address these challenges, the system 100 introduces a capability to automatically detect suspicious device/vehicle presence on non-navigable roads (e.g., via a suspicious exit point and/or off-road location) or restricted areas.

In turn-off mode, positioning sensor(s) of the vehicle 102a or the UE 101a is active then turned off such that the vehicle/UE becomes untraceable. At this point, the system 100 can send an alert of a turn-off location 110c of the vehicle/UE, when determining based on positioning sensor data (e.g., right before the turn-off) that the UE 101a and/or the vehicle 102a deviate from the road 104 and within a threshold proximity 112 in FIG. 1B of a suspicious area (e.g., the restricted area 108a, the NNR 108b, etc.).

In an inactive mode (e.g., location sensor data of the UE 101a and vehicle 102a being unavailable), when determining based on probe data that the UE 101a and/or the vehicle 102a deviate from the road 104 and/or get into a suspicious area (e.g., the restricted area 108a, the NNR 108b, etc.), the system 100 can collect sensor data from a plurality of other user equipment (UE) 101b-101o (collectively referred to UEs 101, e.g., mobile devices, smart phones, etc.) and/or other vehicles 102b-102p (collectively referred to vehicles 102) to determine if any UE/vehicle present in a restricted area and/or NNR.

A non-navigable road (NNR) refers to, for example, a potential path or roadway that is not included in a navigation system for routing purposes (e.g., a path or roadway that does not exist within a map database) and/or a restricted road. For instance, a roadway that does not exist within a map database can be a roadway in a military base, a secret research site, a celebrity residence, a nuclear station, an extraterrestrial beacon site, etc. A restricted road can have any sides or lengths of the road specified as restricted from access or by the public and/or vehicles, the whole time or during restricted hours.

A "restricted area" refers to, for example, an area above and/or in the proximity of a roadway from which the public and/or vehicles are excluded from accessing (e.g., for reasons of security, safety, privacy, etc.) unless specially authorized by a public or private entity that owns, operates, controls, and/or has jurisdiction over the area. Although various embodiments are described with respect to NNRs, it is contemplated that the approach described herein may be used with such restricted areas.

In addition to the suspicious presence events shown in FIG. 1B, the system 100 can identify other kinds of suspicious presence events corresponding to UE 101a and/or vehicle 102a carried by different users or items (e.g., a pedestrian, a passenger of a vehicle, an autonomous vehicle, a drone, etc.) moving on the road 104, e.g., a roadway, a bicycle lane, a sidewalk, etc. Although various embodiments are described with respect to UEs 101 and vehicles 102, it is contemplated that the approach described herein may be used with other types of mobile objects, such as bicycles, drones, etc. which are prohibited from respective restricted areas and/or NNRs. For instance, a suspicious presence event may involve a group of users carrying UEs 101 for illegal gambling on an off-road area, an e-scooter carrying a UE 101a while illegally riding on a sidewalk (e.g., a restricted road for e-scooters), a drone carrying a UE 101a while illegally flying over a bicycle lane below a threshold altitude (e.g., a restricted area for drones), etc.

Some UEs 101 may be carried by vehicles 102 and/or users (e.g., a driver, passenger, pedestrian, etc.) driving or riding in vehicles 102 that may form part of the vehicular traffic for a given area, such that the data associated with the UEs 101 and/or vehicles 102 can be transmitted to a mapping platform 107 via a communication network 109. The mapping platform 107 can include the UEs 101 and/or the vehicles 102 in the roadway traffic or near the roadway for reporting. As a default rule, UE/vehicle detected outside of the barrier 106 and/or beyond a distance threshold 116 from an edge line of the road 104 constitute suspicious presence events. The system 100 can map-match observed object segments to corresponding locations based on map data, and determine the corresponding locations as suspicious locations (e.g., suspicious locations 110a, 110b).

Figure 1C:
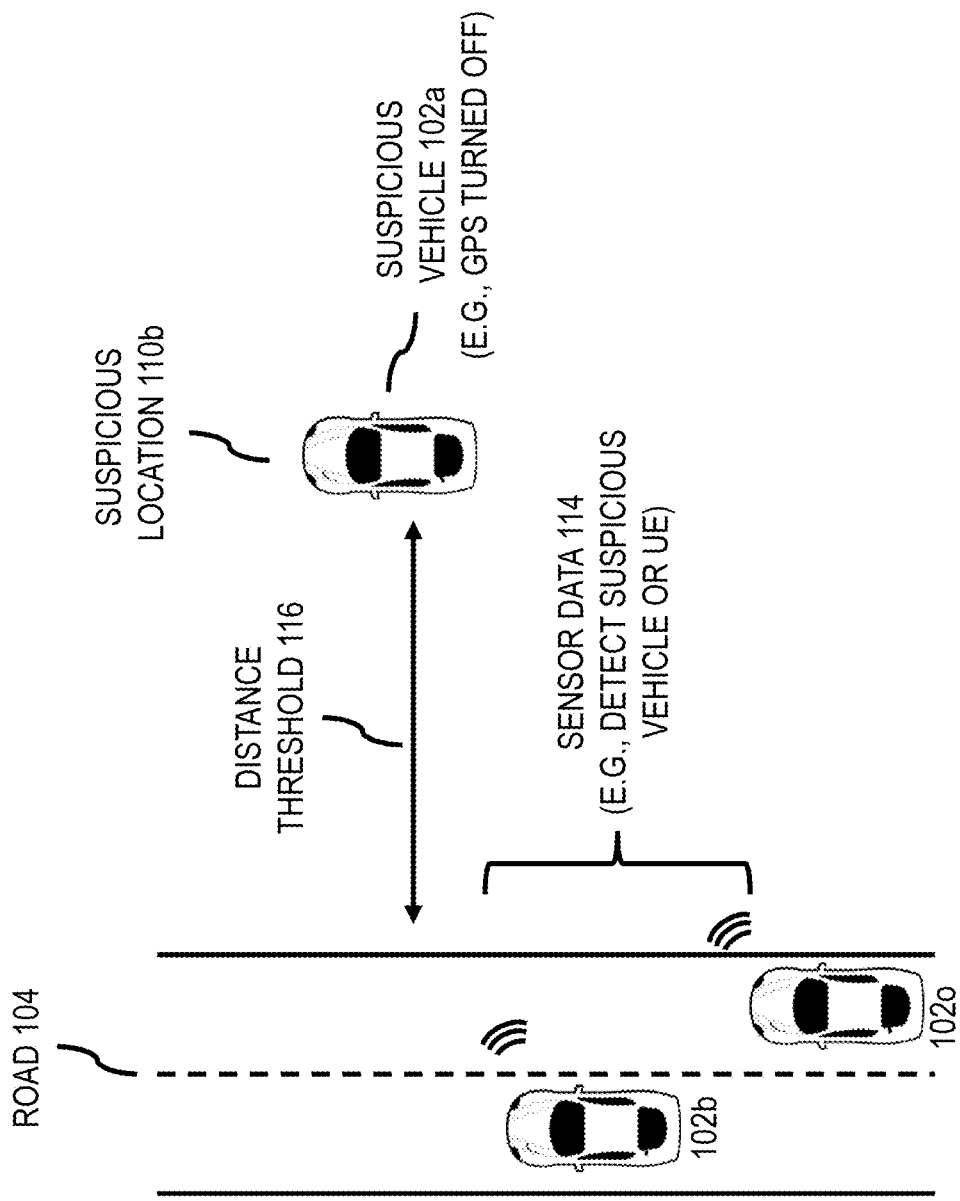
FIG. 1C is a diagram illustrating example sensor data associated with suspicious presence events, according to example embodiment(s)

FIG. 1C is a diagram illustrating example sensor data associated with suspicious presence events, according to example embodiment(s). For instance, vehicles 102b-102o passing via the road 104 captures sensor data 114 (e.g., an image) of suspicious presence events associated with FIG. 1B. The sensor data 114 can be collected by the UEs 101 via its sensors 103a-103o (also collectively referred to sensors 103) (e.g., image sensors, Light Detection and Ranging (LiDAR), etc.) and/or applications 105a-105o (also collectively referred to applications 105) (e.g., a navigation or mapping application).

In another embodiment, the system 100 can retrieve location data of restricted areas and/or NNRs from a geographic database, determine whether the corresponding locations are within the restricted areas and/or NNRs (e.g., the restricted area 108a and the NNR 108b in FIG. 1B), and then determine the corresponding locations as suspicious locations.

Figure 1D:
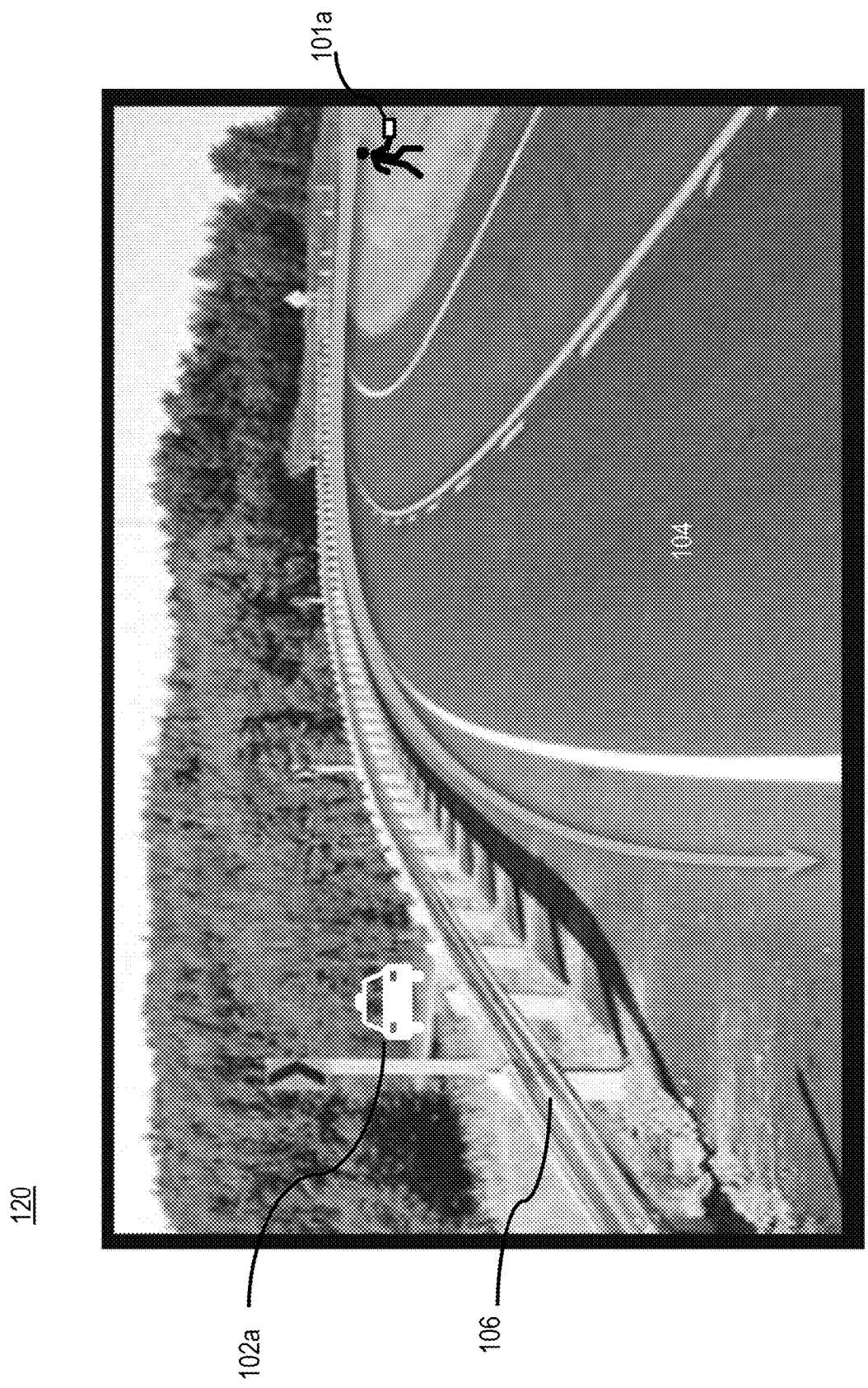
FIG. 1D is a diagram illustrating example image data associated with suspicious presence events, according to example embodiment(s)

FIG. 1D is a diagram illustrating example image data 120 associated with suspicious presence events, according to example embodiment(s). In one embodiment, the system 100 can apply machine-learning based image segmentation (e.g., via a machine learning system) on the image 120 to determine the presence of the UE 101a and/or the vehicle 102a in respective restricted areas and/or NNRs. In this example, the system 100 can distinguish among objects, such as a road, a barrier, a person, a vehicle, a NNR, etc. using a machine learning-based image segmentation algorithm of the machine learning system to classify parts of the image that depict the objects. For example, the image 120 is fed as input into the machine learning system which is uses a trained deep learning network (e.g., a Mask R-CNN) to generate an output comprising the image 120 that has been segmented to identify different image segments and/or semantic object categories.

By analogy, the system 100 can analyze a scan by a LiDAR sensor or equivalent depth sensing sensor, to identify the objects ad their corresponding locations, to determine the presence of the UE 101a and/or the vehicle 102a in respective restricted areas and/or NNRs. For instance, the system 100 can extract from a LiDAR scan (e.g., by extracting features from 3D point clouds of different objects, subsampling the 3D point clouds, cropping the 3D point clouds, etc.), to locate the objects. In this case, multiple point clouds of a road, a barrier, a person, a vehicle, a NNR, etc. can be used to determine their corresponding locations. In one embodiment, UEs 101 can be head mounted devices or any other wearable devices that are equipped with a LiDAR sensor or equivalent depth sensing sensor.

In another embodiment, the system 100 can integrate certain Internet of things (IoT) connected to the communication network 109 using various information and communication technologies. The IOT can be embedded with various physical devices/sensors for connecting and exchanging sensor data with other devices/sensors and systems in the network, in order to detect and report suspicious activities in restricted areas near roadways and/or NNRs. For instance, the IOT can include road furniture (e.g., a fixture or structure on the road or within the road reserve intended to provide information, shelter, or safety to a road user, such as a traffic light, sign post, traffic sign, guardrail, fence, marker post, light pole, reflector or center-line pad, divider, fence, etc.), fire hydrants, mail collection box, etc.

In one embodiment, when location sensor(s) of a vehicle/UE involving in a suspicious activity is active, the system 100 can apply methods of polygon detection, pole number identification and data points detection, barrier breakage detection, etc. to detect and report the suspicious activity. The system 100 can cross-check results from these detection methods. In another embodiment, when location sensor(s) of a vehicle/UE involving in a suspicious activity is inactive, the system 100 can apply the barrier breakage detection to detect and report the suspicious activity. For instance, the system 100 can search/scan for parameters associated with a polygon, pole numbers, data points, and/or a barrier breakage to identify, locate, and detect suspicious vehicle/ UE location(s). These methods can be performed at the edge and/or in the cloud to trigger a smart and accurate alert of suspicious vehicle/UE location point(s), when any of the parameters identify the suspicious vehicle/UE location(s).

In one embodiment, the system 100 can also integrate a confidence interval/factor to measure the accuracy of the suspicious vehicle/UE location(s), e.g., using machine learning and/or other authentication methods. For instance, the confidence factor can indicate a certainty level of the output from clustering of the probes and this confidence factor can range between 0 and 1, for example. When the confidence factor is closer to one (e.g., 0.85), the system 100 is highly confident that a suspicious vehicle/UE is present at the location point. As a result, the system 100 can report the suspicious vehicle/UE location point. When the confidence factor is closer to 0 (e.g., 0.3), the system 100 is unlikely to infer with confidence that a suspicious vehicle/UE is present at the location point. As a result, the system 100 will not suppress/prune the suspicious vehicle/UE location point from reporting.

Once an alert is triggered, a user (e.g., the police, officials, property owner, consumer, etc.,) can reach the suspicious location or can send drone(s) to investigate/verify any suspicious activity being carried out. The system 100 can determine what actions the user should take next, and provide suggestions and/or recommendations generated using an AI/machine learning model.

Furthermore, the system 100 can use other inputs such as the metadata associated with the parameters, e.g., pole numbers, barrier length, time of day, etc., to facilitate the location process, and determine the geographic coordinates of the suspicious location, and then narrow the search for the users (e.g., highway officials, law enforcement, etc.).

In summary, the system 100 can automatically process sensor data (e.g., probe data, image data, etc.) in real-time or substantially real-time, and resolve the suspicious presence event(s) as discussed, to automatically detect and report suspicious device/vehicle presence on non-navigable roads.

FIG. 2 is a diagram of the components of the mapping platform 107, according to example embodiment(s). In one embodiment, the mapping platform 107 includes one or more components for automatically detecting suspicious device/vehicle presence on non-navigable roads according to the various embodiments described herein. As shown in FIG. 2, the mapping platform 107 includes a data processing module 201, a detection module 203, a confirmation module 205, an output module 207, and a machine learning system 115 and has connectivity to the geographic database 111 and a probe database 113. The above presented modules and components of the mapping platform 107 can be implemented in hardware, firmware, software, or a combination thereof. The above presented modules and components of the mapping platform 107 can be implemented in hardware, firmware, software, or a combination thereof. It is contemplated that the functions of these components may be combined or performed by other components of equivalent functionality. Though depicted as a separate entity in FIG. 1A, it is contemplated that the mapping platform 107 may be implemented as a module of any of the components of the system 100 (e.g., a component of the vehicles and/or the UEs 101). In another embodiment, the mapping platform 107 and/or one or more of the modules 201-207 may be implemented as a cloud-based service, local service, native application, or combination thereof. The functions of the mapping platform 107, the machine learning system 115, and/or the modules 201-207 are discussed with respect to FIGS. 4-7 below.

Figure 3:
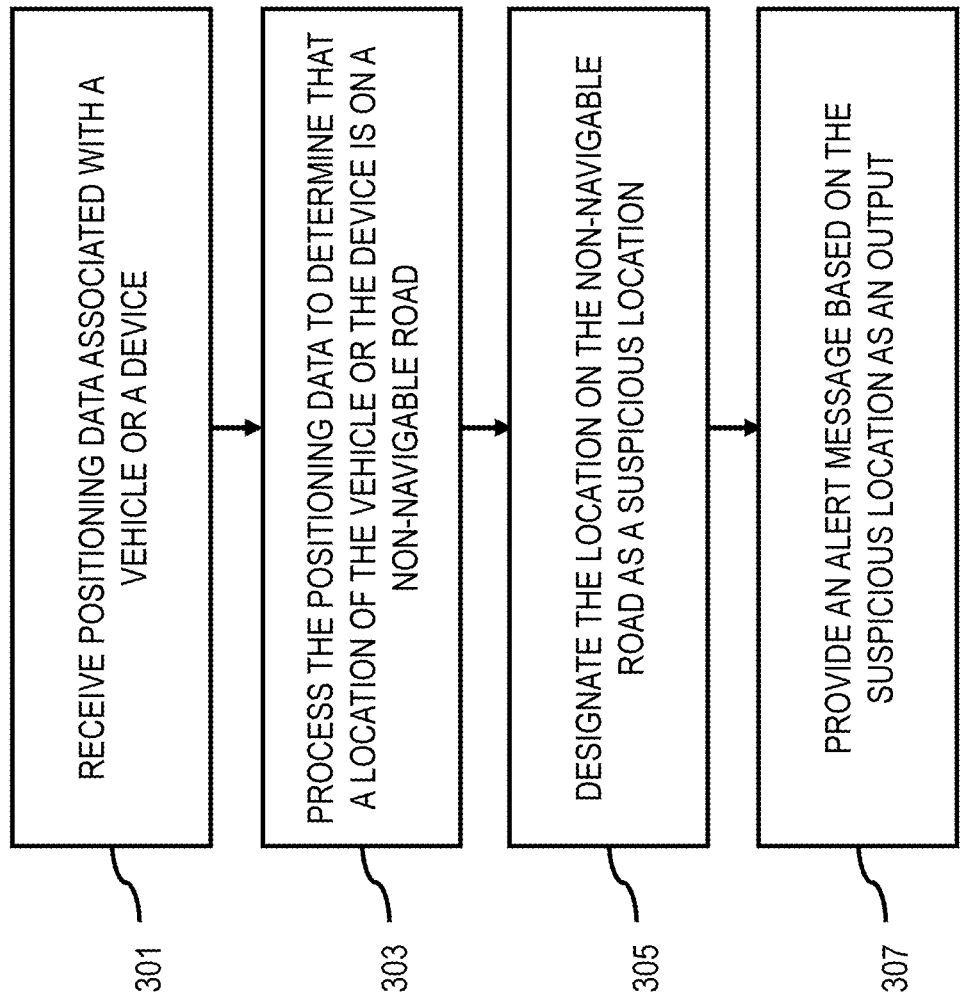
FIG. 3 is a flowchart of a process for automatically detecting suspicious device/vehicle presence on non-navigable roads, according to example embodiment(s)
Figure 10:
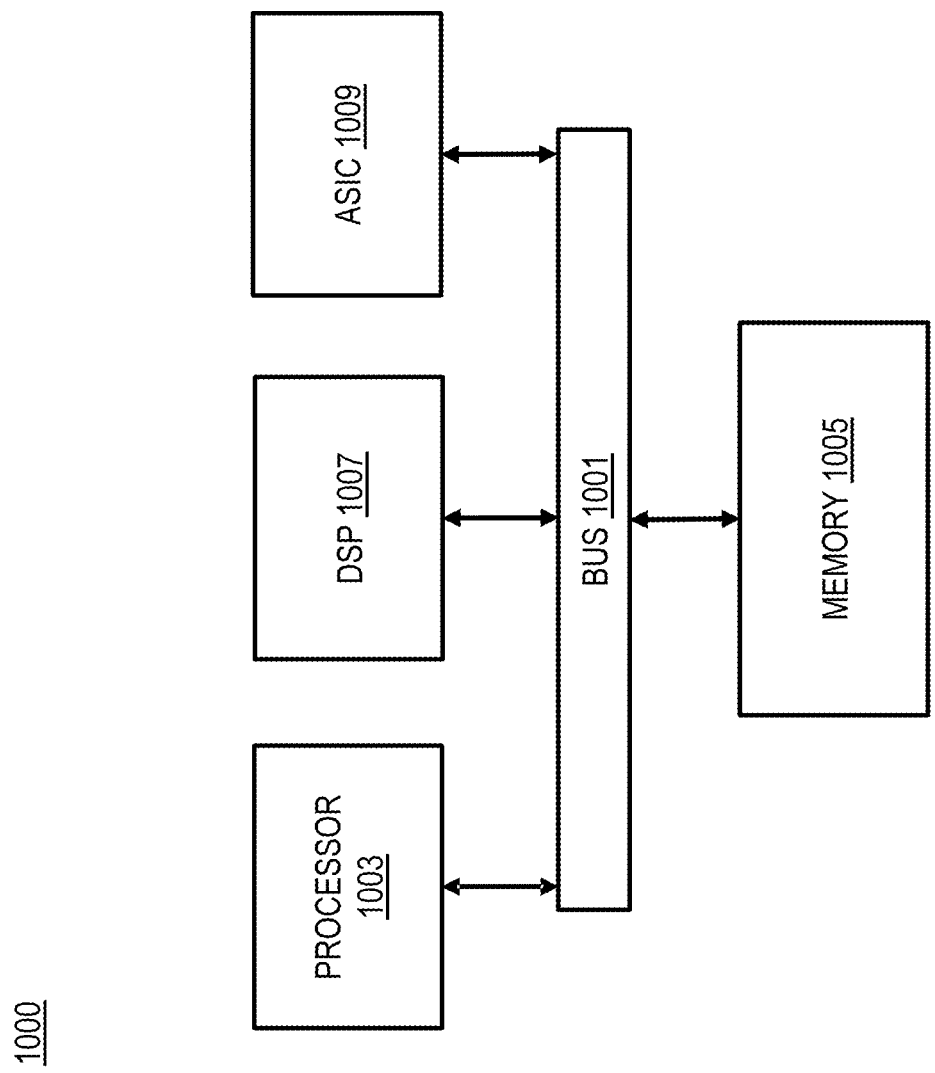
FIG. 10 is a diagram of a chip set that can be used to implement an embodiment of the invention, according to example embodiment(s)

FIG. 3 is a flowchart of a process 300 for automatically detecting suspicious device/vehicle presence on non-navigable roads, according to example embodiment(s). In various embodiments, the mapping platform 107, the machine learning system 115, and/or any of the modules 201-207 may perform one or more portions of the process 300 and may be implemented in, for instance, a chip set including a processor and a memory as shown in FIG. 10. As such, the mapping platform 107 and/or the modules 201-207 can provide means for accomplishing various parts of the process 300, as well as means for accomplishing embodiments of other processes described herein in conjunction with other components of the system 100. The steps of the process 300 can be performed by any feasible entity, such as the mapping platform 107, the modules 201-207, the machine learning system 115, etc. Although the process 300 is illustrated and described as a sequence of steps, it is contemplated that various embodiments of the process 300 may be performed in any order or combination and need not include all the illustrated steps.

In one embodiment, for example, in step 301, the data processing module 201 can receive positioning data (e.g., probe data of the vehicle/UE, geographic coordinates from GPS receivers, camera and/or LiDAR data from nearby vehicles/UEs and road furniture, etc.) associated with a vehicle (e.g., vehicle 102 in FIG. 1B) or a device (e.g., UE 101 in FIG. 1B).

In one instance, the real-time probe data may be reported as probe points, which are individual data records collected at a point in time that records telemetry data for that point in time. A probe point can include attributes such as: (1) probe ID, (2) longitude, (3) latitude, (4) altitude, (5) heading, (6) speed, and (7) time.

In one embodiment, in step 303, the detection module 203 can process the positioning data to determine that a location of the vehicle or the device is on a non-navigable road (e.g., the non-navigable road 106a in FIG. 1B). For instance, the non-navigable road can be a road that does not exist in a geographic database (e.g., the a geographic database 111), a restricted road, or a combination thereof. In one embodiment, in step 305, the detection module 203 can designate the location on the non-navigable road as a suspicious location.

In an inactive mode, a positioning sensor of the vehicle or the device is inactive, and the positioning data is received based on one or more sensors of at least one other device traveling within proximity of the vehicle or device. For instance, nearby vehicles/UEs passing through can capture sensor data of suspicious vehicle/UE presence event(s), such as entering suspicious exit point which is unpaved and non-navigable.

Figure 4B:
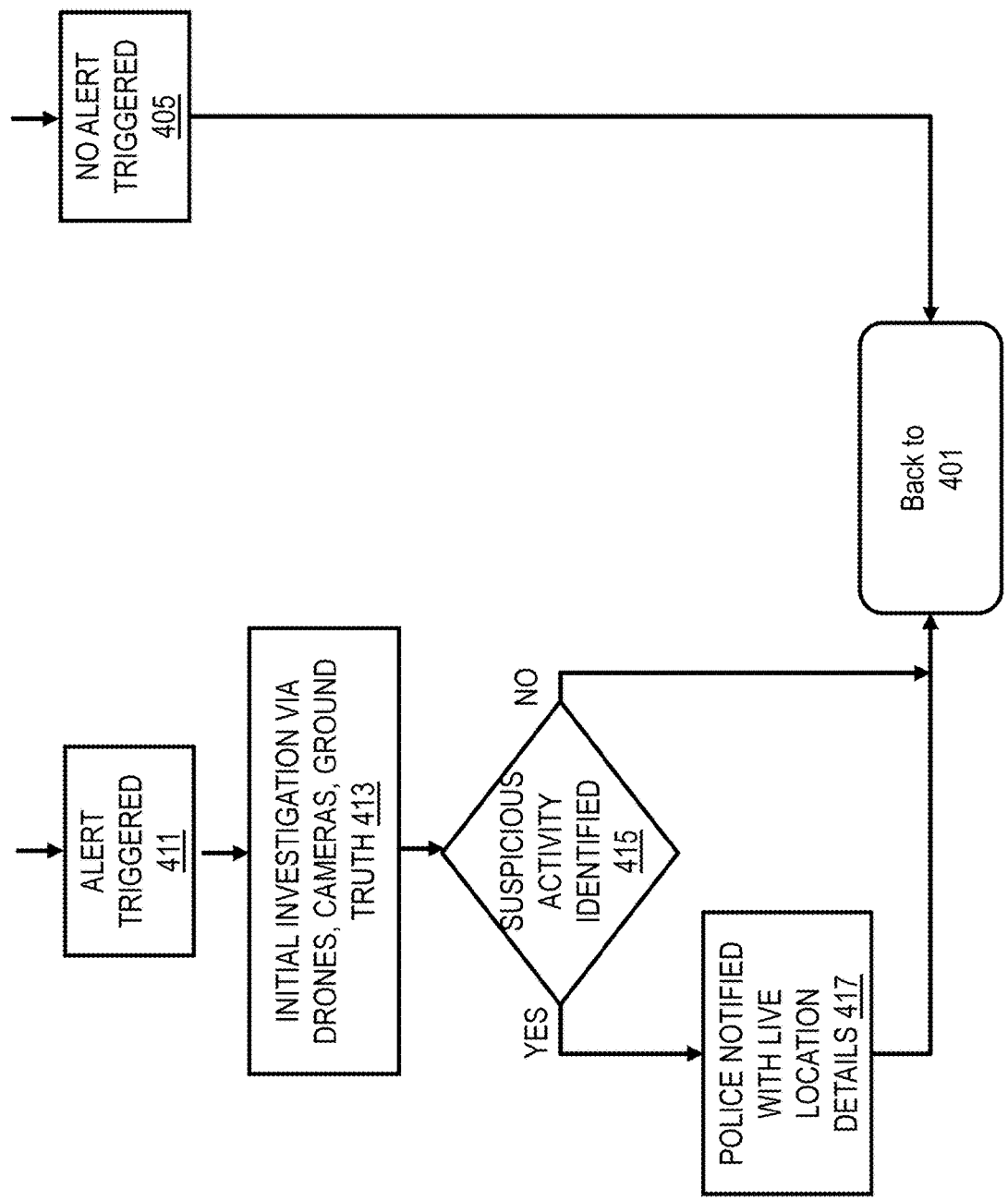

FIGS. 4A-4B is a flowchart 400 of an inactive mode for automatically detecting suspicious device/vehicle presence on non-navigable roads, according to example embodiment(s). When there is no breakage of a barrier/railing up to a threshold road length (e.g., 3 km) or a threshold area (e.g., 3 km radius from a detecting vehicle), yet there is some suspicious presence of a vehicle outside of the barrier/railing (e.g., the barrier 106 in FIG. 1B) captured by sensor data (e.g., dash camera, LiDAR, etc.) of the detecting vehicle(s), road furniture, UEs, etc. The data processing module 201 can receive the data from the detecting vehicle(s) in transit on a roadway (e.g., the road 104 in FIG. 1B) that detect an untagged exit point on map data while spotting another vehicle (e.g., the vehicle 102) is behind the barrier 106.

In FIG. 4A, when a suspicious vehicle/US GPS is "In-Active" in step 401, the detection module 203 can review or verify at least one parameter detection, such as a barrier breakage detection 403. If there is a breakage on the barrier/rail, the detection module 203 can determine the vehicle 102 take a lawful exit and there is no suspicious vehicle presence. Therefore, no alert is triggered in step 405 and the flowchart 400 continues back to step 401 for monitoring suspicious presence.

However, in a non-exit-point scenario, the detection module 203 can process sensor data from the one or more sensors of the at least one other device to detect that the vehicle or the device has exited a road at an exit point, and designate of the location on the non-navigable road as a suspicious location based on determining that the exit point is not recorded in a geographic database. In one embodiment, the detection module 203 can determine the exit point with respect to at least one map feature of a geographic database associated with the road, and the at least one map feature can include one or more pole features, road furniture, or a combination thereof.

For instance, if there is no breakage on the barrier/rail (FIG. 1B), while vehicle(s) in transit continue detecting suspicious vehicle presence outside of the barrier in step 407, the detection module 203 can count suspicious vehicle presence instances detected by passing vehicles up to a threshold value (e.g., 5) in step 409 then confirm the suspicious presence of the vehicle 102*a* (e.g., FIG. 1B).

As there is a suspicious vehicle presence, an alert is triggered in step 411. In addition, the output module 207 can initiate investigation through drones, cameras, ground truth, etc. in step 413 in FIG. 4B (continuing from FIG. 4A). When the initial investigation identifies suspicious vehicle present event(s) in step 415, the output module 207 can notify the police officials with live location details in step 417, and then the flowchart 400 continues back to step 401 for monitoring suspicious presence. As per the initial search, authorities will decide to send highway patrol and/or other agents for ground truth verification. When the initial investigation does not identify any suspicious vehicle present event(s) in step 415, the flowchart 400 continues back to step 401 for monitoring suspicious presence.

Figure 5:
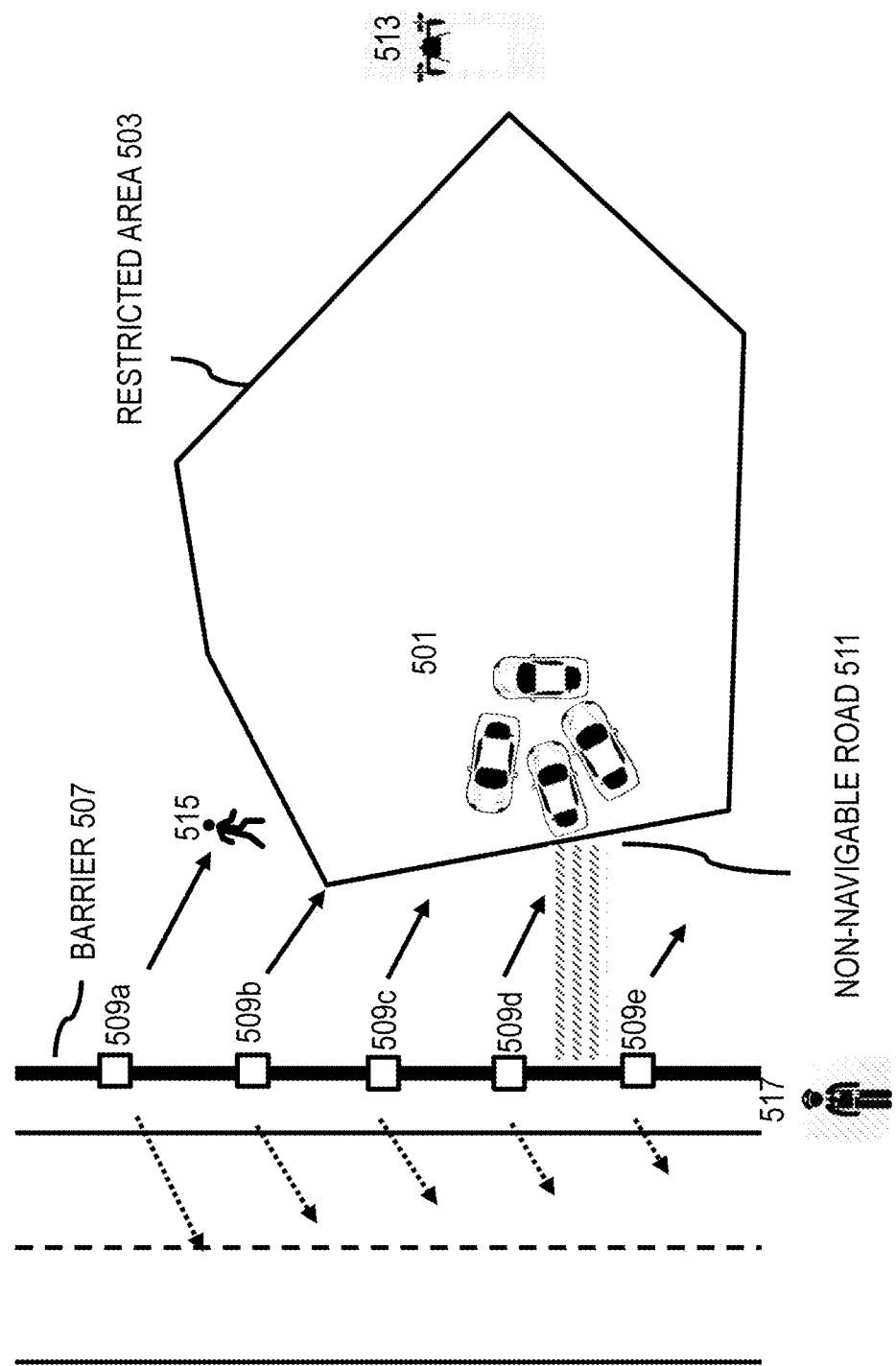
FIG. 5 is a diagram illustrating example suspicious presence events, according to example embodiment(s)

For example, after five moving vehicles back-to-back have spotted that vehicle 102 on a non-navigable road— within a time threshold (e.g., 30 minutes), the detection module 203 can determine there is a suspicious vehicle presence vent and send an alert to nearby users of the system 100 (e.g., farmers, the police, other authorities, etc.) which can perform initial investigation with drones, etc. FIG. 5 is a diagram 500 illustrating example suspicious presence events, according to example embodiment(s). FIG. 5 shows a plurality of vehicles 501 spotted in a restricted area 503 (on a right side of a road 505). The road 505 has a barrier 507 made of a guardrail supported by poles 509*a*-509*e* can be built-in with beacons/sensors. By way of examples, the beacon/sensor can be a wireless network access point, a Bluetooth beacon, a 5G beacon, a fiber wire, etc.

When the beacons/sensors receive signals from the roadside (e.g., dashed arrows pointing left from moving vehicles), the detection module 203 does not trigger any alert. When the beacons/sensors receive signals from the other side (e.g., solid arrows pointing right from the restricted area 503 and/or a NNR 511), the detection module 203 can trigger an alert for initial investigation by a drone 513. The drone 513 can verify the presence of vehicles 501 in the restricted area 503 and a user 515 heading toward the restricted area 503. The authority can dispatch a policemen 517 for further investigation.

In one embodiment, the confirmation module 205 can initiate a confirmation of the suspicious location based on a minimum number of observations of the vehicle or the device at the suspicious location by the at least one other device in the non-exit-point scenario. In one embodiment, the confirmation module 205 can initiate a confirmation of the suspicious location based on determining that the location on the non-navigable road is beyond a boundary of a proximate road in the inactive mode. A proximate road can be the nearest road to where the non-exit-point is, or a road within a threshold proximity of the non-exit-point. For instance, the confirmation can be based on the location on the non-navigable road being a distance threshold beyond the boundary of the proximate road. By way of example, the boundary can be a physical barrier, a lane boundary, or a combination thereof of the proximate road.

In the turn-off mode, the confirmation module 205 can initiate a confirmation of a suspicious location based on determining that a positioning sensor of the vehicle or the device has been manually turned off at the location on the non-navigable road. If users/vehicles "manually turning off" their location senser(s) at or near a barrier opening (e.g., intentional design) or breakage (e.g., damage causing safety hazard), an alert will be triggered for further investigation. Referring back to FIG. 1B (depicting a barrier with curvature), the confirmation module 205 can index and continuously monitor similar (barrier curvature) areas to alert users of a potential breach/break hazard. When a user(s) and/or non-user(s) is aware of a potential barrier breach/breakage hazard, and still navigates toward the hazard, this may also trigger an alert for further investigation.

Figure 6B:
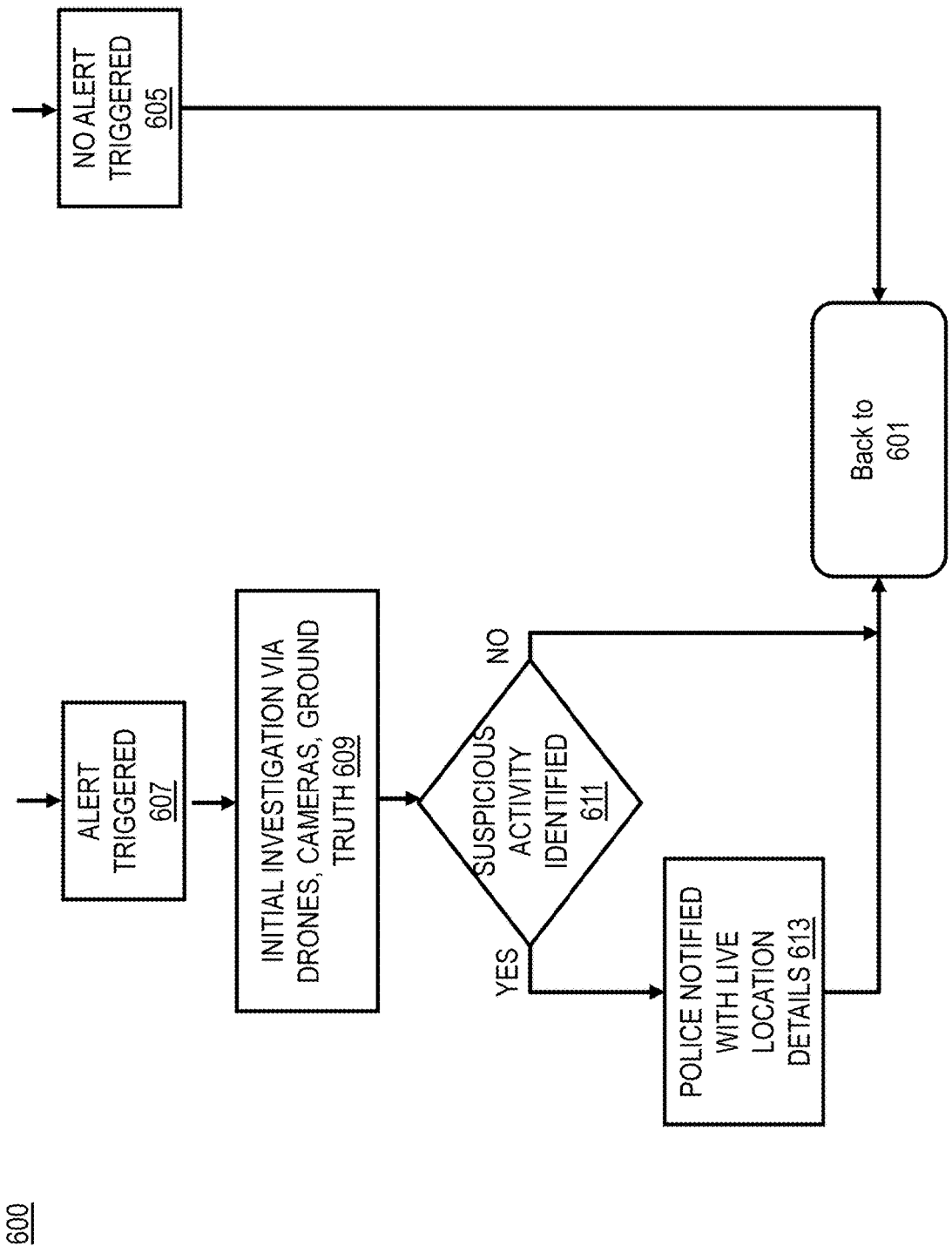

FIGS. 6A-6B is a flowchart 600 of the turn-off mode for automatically detecting suspicious device/vehicle presence on non-navigable roads, according to example embodiment(s). In FIG. 6A, when a vehicle/UE location sensor is active then turned off in step 601, the detection module 203 can review or verify at least one of the following three parameter detections, such as a polygon detection method to determine whether the turn-off location is within an existing polygon in step 603. If the turn-off location is within an existing polygon (e.g., a farm house with an unpaved road), the detection module 203 can determine that the vehicle/UE location sensor is turned off normally, for example, based on heuristic approaches or machine learning model(s), and there is no suspicious vehicle/UE presence. Therefore, no alert is triggered in step 605 and the flowchart 600 continues back to step 601 for monitoring suspicious presence.

If the turn-off location is outside of any existing polygon, the detection module 203 can determine that there is a suspicious vehicle/UE presence, an alert is triggered in step 607. In addition, the output module 207 can initiate investigation through drones, cameras, ground truth, etc. in step 609. When the initial investigation identifies suspicious vehicle present event(s) in step 611 in FIG. 6B (continuing from FIG. 6A), the output module 207 can notify the police officials with live location details in step 613, and then the flowchart 600 continues back to step 601 for monitoring suspicious presence. As per the initial search, authorities will decide to send highway patrol and/or other agents for ground truth verification. When the initial investigation does not identify any suspicious vehicle present event(s) in step 611, the flowchart 600 continues back to step 601 for monitoring suspicious presence.

Alternatively or concurrently, the detection module 203 can apply a pole number identification and data points detection method to determine the turn-off location with respect to pole number and/or data points in step 615. In step 617, the detection module 203 can first identify pole numbers (and/or other metadata) in step 617 and match the turn-off location (e.g., in geographic coordinates) as in-between two poles (e.g., 509*d*, 509*e* in FIG. 5) of the barrier 507 in step 619. For instance, the turn-off location of the vehicle/UE can be measured based on positions of one or more of beacons/sensors/WiFi access points installed on the roadside poles. The feature data of the poles (e.g., locations, sensor type, etc.) can be retrieved online or offline from a map database (e.g., the geographic database 111, a urban city planning database that indexes Bluetooth, Wi-Fi, placement of 5G infrastructure, etc.)

In step 621, the detection module 203 can further perform data points detection to determine which way the vehicle/UE moves towards after the turn-off location. For instance, when the beacons/sensors of the roadside poles 509 in FIG. 5 detect that the vehicle/UE moved from the turn-off location to outside of the barrier 507 (i.e., an outside data point) in step 623, the detection module 203 can determine that there is a suspicious vehicle/UE presence, an alert is triggered in step 607. The output module 207 can then initiate investigation through drones, cameras, ground truth, etc. in step 609, then proceed with step 611 as discussed.

For instance, a roadway of 25 kms has 5 drivable exit points and 5 POI points. It is understood that vehicle/UE traffic can be moving around these 10 geographic locations. However, when a new/11th off-road exit is detected, there may be suspicious/illegal activities going on. This can trigger the roadway patrolling authorities to do an initial check.

However, when the beacons/sensors of the roadside poles 509 detect that the vehicle/UE moved from the turn-off location to inside of the barrier 507 (i.e., a roadside data point) in step 625, the detection module 203 can determine that there is no suspicious vehicle/UE presence, and no alert is triggered in step 605 and the flowchart 600 continues back to step 601 for monitoring suspicious presence.

Alternatively or concurrently, the detection module 203 can apply the barrier breakage method to determine the turn-off location in step 627, similar to step 403 in FIG. 4A (although steps 407-409 are carried out although omitted from FIG. 6A). After determining the vehicle/UE took a unlawful exit (e.g., by counting suspicious vehicle/UE presence instances up to a threshold value, and an alert is triggered in step 607. The output module 207 can then initiate investigation through drones, cameras, ground truth, etc. in step 609, then proceed with step 611 as discussed. Otherwise, the detection module 203 can determine the vehicle/UE did not take a unlawful exit, and no alert is triggered in step 605, and the flowchart 600 continues back to step 601 for monitoring suspicious presence. For instance, when there is a vehicle/UE location detected on the outside of a guardrail while there is no guardrail breakage up to 3 km radius, the detection module 203 can determine a suspicious activity to trigger an alert.

In one embodiment, in step 307 of FIG. 3, the output module 207 can provide an alert message based on the suspicious location as an output. In one embodiment, the output module 207 can initiate a dispatch of a drone, an investigative unit, or a combination thereof to the suspicious location based on the alert message.

Figure 7A:
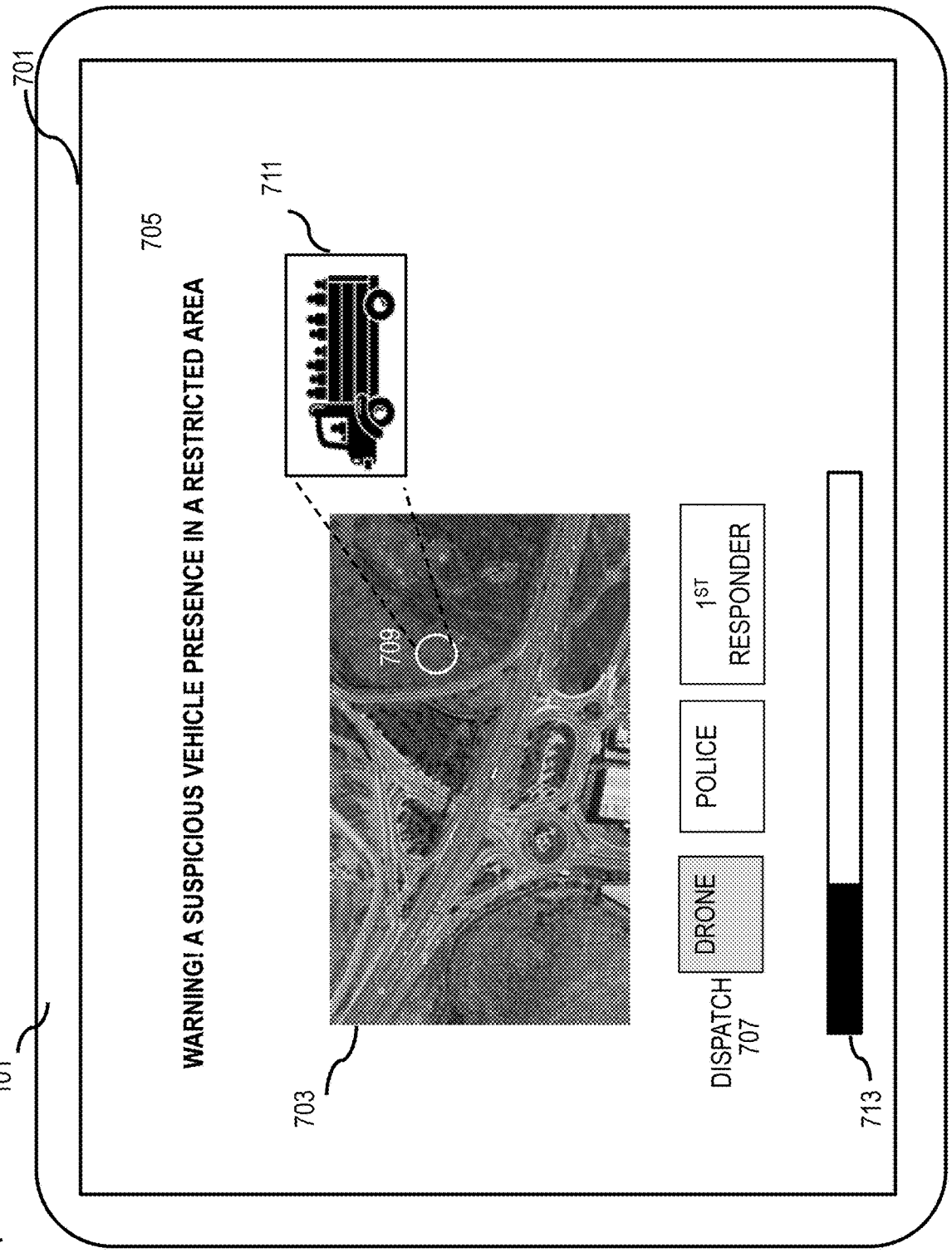
FIGS. 7A-7B are diagrams of example user interfaces of suspicious device/vehicle presence in a restricted area, according to example embodiment(s)
Figure 7B:
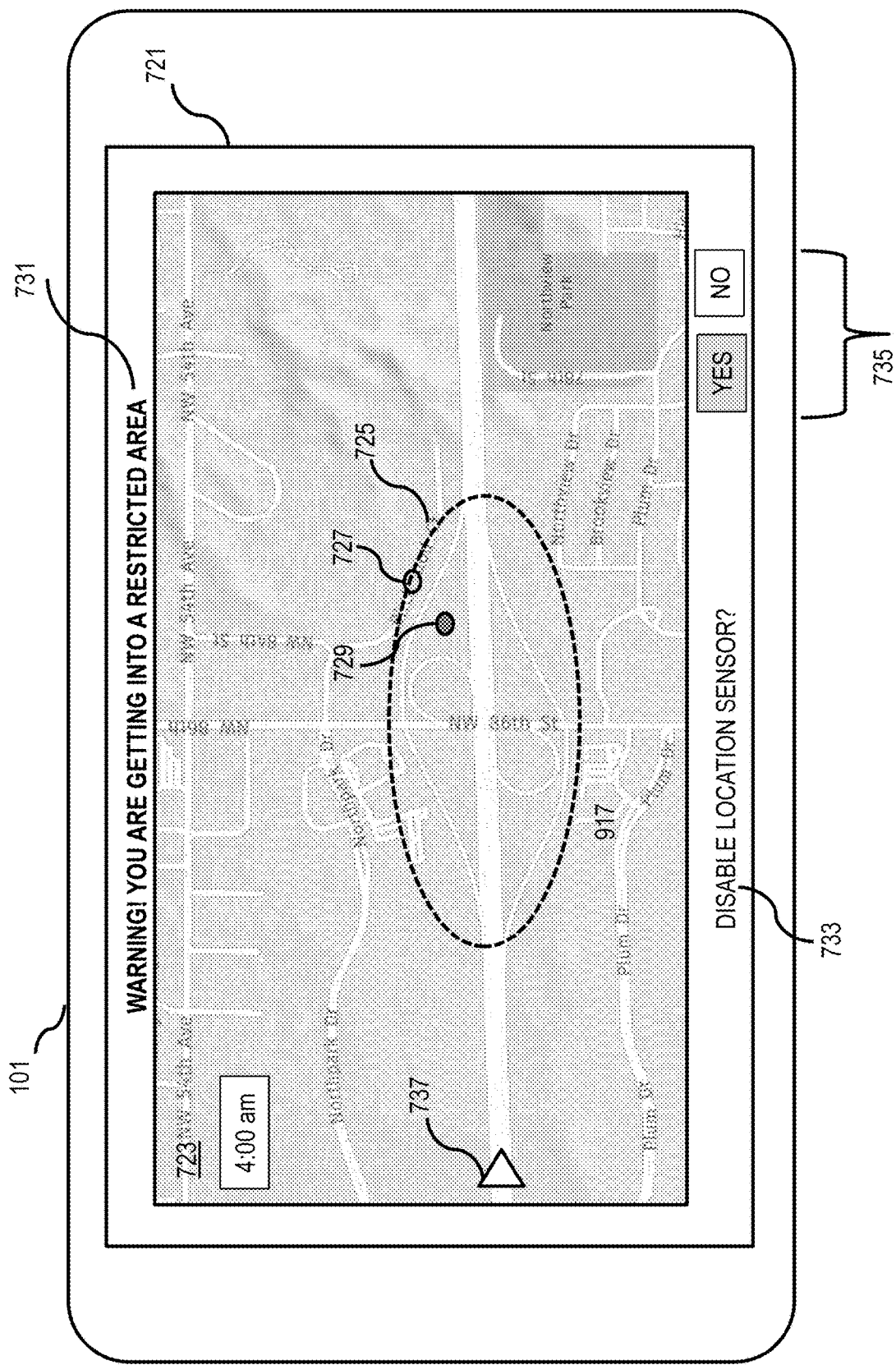

FIGS. 7A-7B are diagrams of example user interfaces of suspicious device/vehicle presence on a restricted area, according to example embodiment(s). FIG. 7A is a diagram of an example user interface (UI) 701 of a UE 101 for dispatching investigating means, according to example embodiment(s). The UI 701 shows an image 703, an alert 705: "Warning! A suspicious vehicle presence in a restricted area," and dispatching options 707 including drone, police, first respondent, drug enforcement, bomb squad, police dog, etc. The suspicious vehicle presence is detected in the restricted area based on the above-discussed embodiments.

After a user (e.g., an public authority stuff, a property owner, etc.) selects the drone option, a drone is dispatched to a location 709 of the suspicious vehicle presence (e.g., a grass field near the interchange prohibited from entering). The user can instruct the drone to take an image 711 that show a truck full of suspicious people. In addition, the user can manipulate a slide bar 713, to adjust a distance between the drone and the truck so as to take better image(s). FIG. 7B is a diagram of an example user interface (UI) 721 associated with a navigation application capable of displaying restricted area(s), according to example embodiment(s). In this example, the UI 721 shown is generated for a UE 101 (e.g., a mobile device, an embedded navigation system, a client terminal, etc.) that includes a map 723, a restricted area 725, a current location 727 of the UE 101, and a truck location 729 (e.g., the truck in FIG. 7A) where a user (e.g., a suspicious person) of the UE 101 try to reach. The system 100 is monitoring vehicles/UEs in the restricted area to spot suspicious presence event(s), such as drug/human trafficking. As soon as the UE 101 arrives at a geo-fence of the restricted area 725, the system 100 can generate an alert 731: "Warning! You are getting into a restricted area," a query 733: "Disable location sensor?" and options 735 of "Yes" and "No". In addition, the system 100 can detect and display approaching object(s) 737, such as a drone, police, etc. for the user on the UI 721.

In one instance, the UE 101 could also be a headset, goggle, or eyeglass device used separately or in connection with a mobile device. In one embodiment, the system 100 can present or surface the output data in multiple interfaces simultaneously (e.g., presenting a 2D map, a 3D map, an augmented reality view, a virtual reality display, or a combination thereof). In one embodiment, the system 100 could also present the output data to a user through other media including but not limited to one or more sounds, haptic feedback, touch, or other sensory interfaces. For example, the system 100 could present the output data through the speakers of a vehicle carrying the user.

In one embodiment, the mapping platform 107 may provide interactive user interfaces (e.g., associated with the UEs 101) for reporting suspicious presence events based on user inputs (e.g., crowd-sources via Mechanical Turk (MTurk)®, Crowd Flowers®, etc.). For example, the user interface can present an interactive user interface element or a physical controller such as but not limited to a knob, a joystick, a rollerball or trackball-based interface, a pressure sensor on a screen or window whose intensity reflects the movement of time, an interface that enables gestures/touch interaction, an interface that enables voice commands, or other sensors. By way of example, the other sensors (e.g., sensors 103) are any type of sensor that can detect a user's gaze, heartrate, sweat rate or perspiration level, eye movement, body movement, or combination thereof, in order to determine a user context or a response to report suspicious presence events. In one embodiment, the system 100 and the user interface element, e.g., a joystick, enable a user to report suspicious presence events (e.g., provide the system 100 with ground truth data).

In one embodiment, the detection module 203 can determine a mode of transport per UE based on the location, height data, distance data, speed data, etc. By way of example, the mode of transport includes walking, car, bus, truck, or bicycle. In one instance, the map data of roadway/sidewalk/bicycle land width, etc. may be stored in or accessible via the geographic database 111. The mode of transport data can be considered by the suspicious presence event machine learning model.

In another embodiment, the detection module 203 can process sensor data (e.g., sensor data such as gyroscope data, accelerometer data, etc.) from the plurality of probes (e.g., UEs 101) to determine one or more movement signatures (e.g., based on distance, height, angles of rotation from the access point (gyroscope), speed (accelerometer), vibration, etc.), noise signatures (e.g., of vehicles running on grass, people climbing over walls, etc.), etc. shared by suspicious vehicle/UE presence events. The movement signatures can be considered by the suspicious presence event machine learning model. By way of example, illegal immigrants moving across borders with location-based movement signatures, such as dessert, river, mountains, highway, etc.

In one embodiment, the output module 207 can integrate blockchain technology to compare and analyze the location-based movement signatures against real-time and historical data (blockchain), to generate/enhance a suspicious presence event machine learning model that can decide whether a suspicious presence event occurs.

In one embodiment, the data processing module 201 can receive sensor data from at least one vehicle traveling on a road (e.g., the road 104 in FIG. 1B). For instance, the sensor data can include image data captured by the at least one vehicle. The detection module 203 can process the sensor data to detect that another vehicle (e.g., the vehicle 102 in FIG. 1B) has exited the road at an exit point, and designate that the another vehicle is engaged in a suspicious activity based on determining that the exit point is not recorded as an exit in a geographic database (e.g., the geographic database 111). In one embodiment, the confirmation module 205 can initiate a confirmation of the suspicious activity based on determining that a positioning sensor of the another vehicle (e.g., the vehicle 102) is inactive or manually turned off. In one embodiment, the confirmation module 205 can initiate a confirmation of the suspicious activity based on a minimum number of observations (e.g., five times) of the another vehicle by the at least one vehicle. The output module 207 can provide an alert message based on the suspicious activity as an output.

In one embodiment, the detection module 203 can determine a location at which a vehicle (e.g., the vehicle 102 in FIG. 1B) or a device (e.g., the UE 101) has manually turned off a positioning sensor of the vehicle or the device, query a geographic database (e.g., the geographic database 111) to determine that the location is on a non-navigable road (e.g., the NNR 108b), and designate the location on the non-navigable road as a suspicious location. In one embodiment, the confirmation module 205 can initiate a confirmation of the suspicious location based on determining that the location on the non-navigable road is beyond a boundary of a proximate road (e.g., the road 104), and the confirmation can be based on the location on the non-navigable road being a distance threshold beyond the boundary of the proximate road. For instance, the boundary can be a physical barrier, a lane boundary, or a combination thereof of the proximate road, and the boundary meets a minimum barrier distance threshold. The output module 207 can provide an alert message based on the suspicious location as an output.

In one embodiment, the machine learning system 115 can apply a machine learning data matrix/table on contextual features including road feature(s) (e.g., speed limit, guard rail (e.g., poles, beacon/sensor, etc.), signs, map features associated with additional roadway furniture, navigable or non-navigable, etc.); restricted area feature(s) (e.g., polygon, type, restricted usage, restricted hours, etc.); mode of transport feature(s) (e.g., make, model, sensors, speed, sensor operations, autonomous vehicle (AV)/manual mode, etc.); user features (e.g., age, height, stride, mobility patterns, etc.); environmental features (e.g., weather, events, traffic, traffic light status, construction status, visibility, etc.), etc., in addition to suspicious presence event categories (e.g., drug/human trafficking, illegal gathering/gambling, etc.) and action categories (e.g., dispatching drone, police, first respondent, drug enforcement, bomb squad, etc.). For instance, a suspicious presence event category can be derived from map data, sensor data, probe data, the above-listed contextual feature data, etc. using the suspicious presence event machine learning model to identify a suspicious presence event.

By way of example, the matrix/table can list relationships among context features and training data. For instance, notation $\{rdf\}^i$ can indicate the ith set of road features, notation $\{raf\}^i$ can indicate the ith set of restricted area features, $\{vf\}^i$ can indicate the ith set of mode of transport features, $\{uf\}^i$ can indicate the ith set of user features, $\{ef\}^i$ can indicate the ith set of environmental features, etc.

In one embodiment, the training data can include ground truth data taken from historical suspicious presence event data (e.g., stored in or accessible via the geographic database 111). For instance, in a data mining process, context features are mapped to ground truth map objects/features to form a training instance. A plurality of training instances can form the training data for the suspicious presence event machine learning model using one or more machine learning algorithms, such as random forest, decision trees, etc. For instance, the training data can be split into a training set and a test set, e.g., at a ratio of 70%:30%. After evaluating several machine learning models based on the training set and the test set, the machine learning model that produces the highest classification accuracy in training and testing can be used (e.g., by the machine learning system 115) as the suspicious presence event machine learning model. In addition, feature selection techniques, such as chi-squared statistic, information gain, gini index, etc., can be used to determine the highest ranked features from the set based on the context feature's contribution to classification effectiveness.

In other embodiments, ground truth suspicious presence event data can be more specialized than what is prescribed in the matrix/table. For instance, the ground truth could be specific suspicious presence events. In the absence of one or more sets of the contextual features, the model can still function using the available features.

In one embodiment, the suspicious presence event machine learning model can learn from one or more feedback loops based on, for example, vehicle behavior data and/or feedback data (e.g., from users), via analyzing and reflecting how suspicious presence event conflicts were generated, etc. The suspicious presence event machine learning model can learn the cause(s), for example, based on the suspicious presence event categories and/or action categories and/or actions, to identify suspicious presence events and to add new suspicious presence events/features into the model based on this learning.

In other embodiments, the machine learning system 115 can train the suspicious presence event machine learning model to select or assign respective weights, correlations, relationships, etc. among the contextual features, to identify suspicious presence events and to add new suspicious presence events/features and/or actions into the model. In one instance, the machine learning system 115 can continuously provide and/or update the machine learning models (e.g., a support vector machine (SVM), neural network, decision tree, etc.) of the machine learning system 115 during training using, for instance, supervised deep convolution networks or equivalents. In other words, the machine learning system 115 trains the machine learning models using the respective weights of the features to most efficiently select optimal action(s) to take for different suspicious presence event scenarios in different geographic areas (e.g., streets, city, country, region, etc.).

In another embodiment, the machine learning system 115 of the mapping platform 107 includes a neural network or other machine learning system(s) to update enhanced features in different geographic areas. In one embodiment, the neural network of the machine learning system 115 is a traditional convolutional neural network which consists of multiple layers of collections of one or more neurons (which are configured to process a portion of an input data). In one embodiment, the machine learning system 115 also has connectivity or access over the communication network 109 to the probe database 113 and/or the geographic database 111 that can each store map data, the feature data, the output data, etc.

The above-discussed embodiments can be applied to analyze sensor data from the vehicle/UE and/or nearby vehicles/UEs with the help to identify, locate and/or detect suspicious vehicle/UE presence events. In addition, the above-discussed embodiments can trigger alerts and/or actions to prevent and/or prohibit suspicious and/or illegal activities around roadways. Once an alert is triggered, officials can dispatch drones investigate in place of physical ground verification search and provide image(s) of the suspect or vehicle. The suspicious present event data can be tagged for training a machine learning model.

In one embodiment, the system 100 can collect the sensor data, contextual data, or a combination through one or more sensors such as the sensors 103, vehicle sensors connected to the system 100 via the communication network 109 (including camera sensors, light sensors, LiDAR sensors, radar, infrared sensors, thermal sensors, and the like), etc. to determine the type/kind of the suspicious presence events.

In one embodiment, the vehicles can be autonomous vehicles or highly assisted driving (HAD) vehicles that can sense their environments and navigate within a travel network without driver or occupant input. In one embodiment, the above-mentioned vehicle sensors acquire map data and/or sensor data when the vehicles travel on the street for detecting suspicious presence events, such as human/drug trafficking.

By way of example, the vehicle sensors may be any type of sensors that detect various context data. In certain embodiments, the vehicle sensors may include, for example, a global positioning sensor for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., for detecting objects proximate to the vehicles), an audio recorder for gathering audio data (e.g., detecting nearby humans or animals via acoustic signatures such as voices or animal noises), velocity sensors, and the like. In another embodiment, the vehicle sensors may include sensors (e.g., mounted along a perimeter of the vehicles) to detect the relative distance of the vehicles from any map objects/features, such as lanes or roadways, the presence of other vehicles, pedestrians, animals, traffic lights, road features (e.g., curves) and any other objects, or a combination thereof. In one scenario, the vehicle sensors may detect weather data, traffic information, or a combination thereof. In one example embodiment, the vehicles may include GPS receivers to obtain geographic coordinates from satellites 123 for determining current location and time. Further, the location can be determined by a triangulation system such as A-GPS, Cell of Origin, or other location extrapolation technologies when cellular or network signals are available. In another example embodiment, the one or more vehicle sensors may provide in-vehicle navigation services.

In one embodiment, the UEs 101 can be associated with any of the types of vehicles or a person or thing traveling within the geographic area. By way of example, the UEs 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UEs 101 can support any type of interface to the user (such as "wearable" circuitry, etc.). In one embodiment, the vehicles may have cellular or wireless fidelity (Wi-Fi) connection either through the inbuilt communication equipment or from the UEs 101 associated with the vehicles. Also, the UEs 101 may be configured to access the communication network 109 by way of any known or still developing communication protocols.

In one embodiment, the mapping platform 107 has connectivity over the communication network 109 to the services platform 117 that provides the services 119 (e.g., as in FIG. 1). In another embodiment, the services platform 117 and content providers 121 communicate directly (not shown in FIG. 1). By way of example, the services 119 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the content providers 121 may provide content or data (e.g., including geographic data, output data of the processes 300, 400, 600, historical mobility data, etc.). The content provided may be any type of content, such as map content, output data, audio content, video content, image content, etc. In one embodiment, the content providers 121 may also store content associated with the probe database 113, geographic database 111, mapping platform 107, services platform 117, services 119, and/or vehicles traveling on a road segment of interest. In another embodiment, the content providers 121 may manage access to a central repository of data, and offer a consistent, standard interface to data, such as a repository of the probe database 113 and/or the geographic database 111.

The communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 2/3/4/5/6G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 107 may be a platform with multiple interconnected components. By way of example, the mapping platform 107 may include multiple servers, intelligent networking devices, computing devices, components, and corresponding software for determining upcoming vehicle events for one or more locations based, at least in part, on signage information. In addition, it is noted that the mapping platform 107 may be a separate entity of the system 100, a part of the services platform 117, the one or more services 119, or the content providers 121.

By way of example, the vehicles traveling on the road segment of interest, the UEs 101, the mapping platform 107, the services platform 117, the services 119, and the content providers 121 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
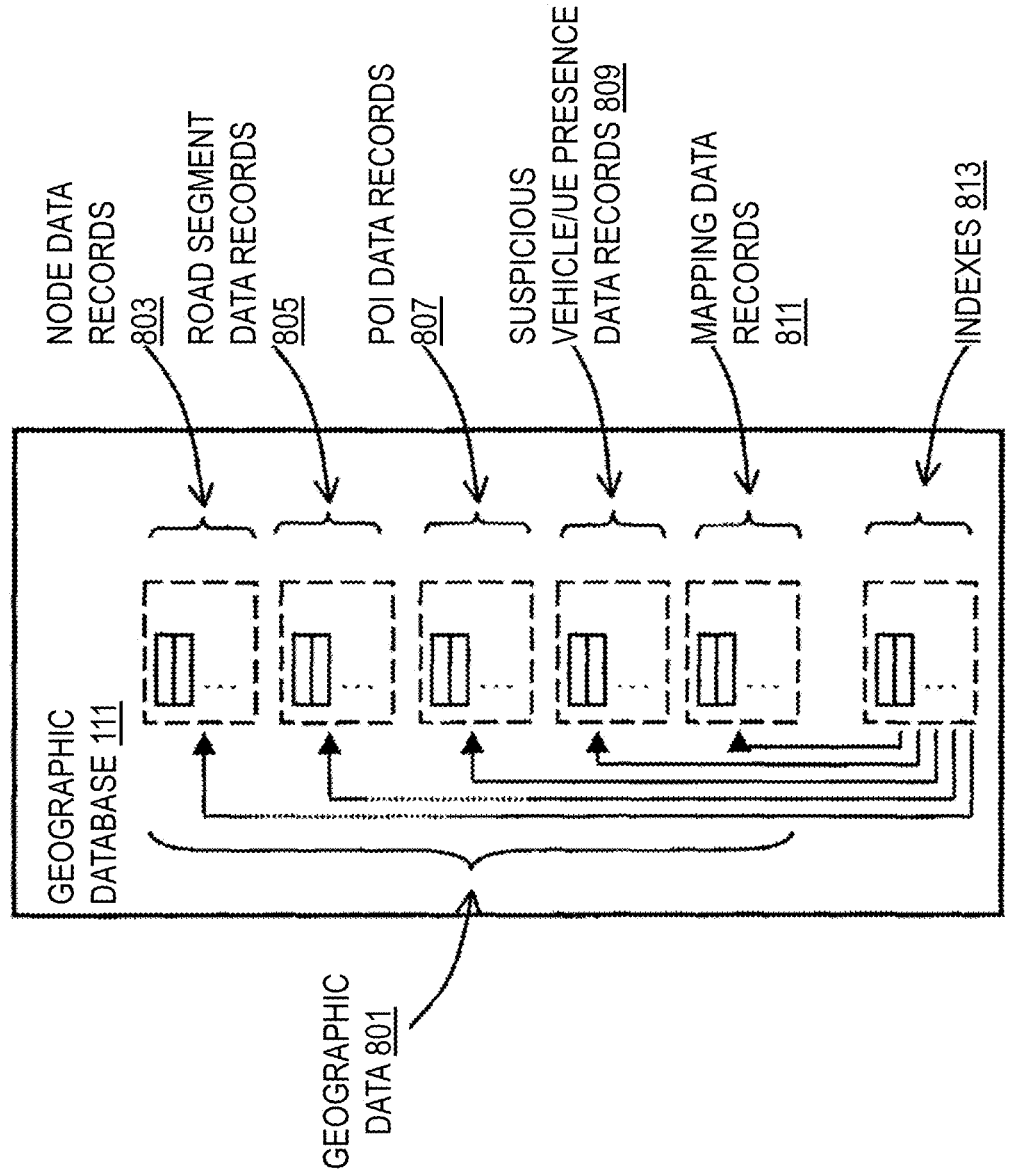
FIG. 8 is a diagram of a geographic database, according to example embodiment(s)

FIG. 8 is a diagram of a geographic database (such as the map database 111), according to one embodiment. In one embodiment, the geographic database 111 includes geographic data 801 used for (or configured to be compiled to be used for) mapping and/or navigation-related services, such as for video odometry based on the parametric representation of lanes include, e.g., encoding and/or decoding parametric representations into lane lines. In one embodiment, the geographic database 111 include high resolution or high definition (HD) mapping data that provide centimeter-level or better accuracy of map features. For example, the geographic database 111 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 811) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 803, road segment or link data records 805, POI data records 807, suspicious vehicle/UE presence data records 809, mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 111. In one embodiment, the indexes 813 may be used to quickly locate data without having to search every row in the geographic database 111 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points (such as intersections) corresponding to the respective links or segments of the road segment data records 805. The road link data records 805 and the node data records 803 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 807. The geographic database 111 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city). In one embodiment, certain attributes, such as lane marking data records, mapping data records and/or other attributes can be features or layers associated with the link-node structure of the database.

In one embodiment, the geographic database 111 can also include suspicious vehicle/UE presence data records 809 for storing non-navigable road data, restricted area data, road furniture data, sensor data, suspicious vehicle/UE presence event data, a suspicious vehicle/UE presence machine learning model, training data, prediction models, annotated observations, computed featured distributions, sampling probabilities, and/or any other data generated or used by the system 100 according to the various embodiments described herein. By way of example, the suspicious vehicle/UE presence data records 809 can be associated with one or more of the node records 803, road segment records 805, and/or POI data records 807 to support localization or visual odometry based on the features stored therein and the corresponding estimated quality of the features. In this way, the records 809 can also be associated with or used to classify the characteristics or metadata of the corresponding records 803, 805, and/or 807.

In one embodiment, as discussed above, the mapping data records 811 model road surfaces and other map features to centimeter-level or better accuracy. The mapping data records 811 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 811 are divided into spatial partitions of varying sizes to provide mapping data to vehicles and other end user devices with near real-time speed without overloading the available resources of the vehicles and/or devices (e.g., computational, memory, bandwidth, etc. resources).

In one embodiment, the mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 811.

In one embodiment, the mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 111 can be maintained by the content provider 121 in association with the services platform 117 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle (e.g., vehicles and/or UEs 101) along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 102 or a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for automatically detecting suspicious device/vehicle presence on non-navigable roads may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
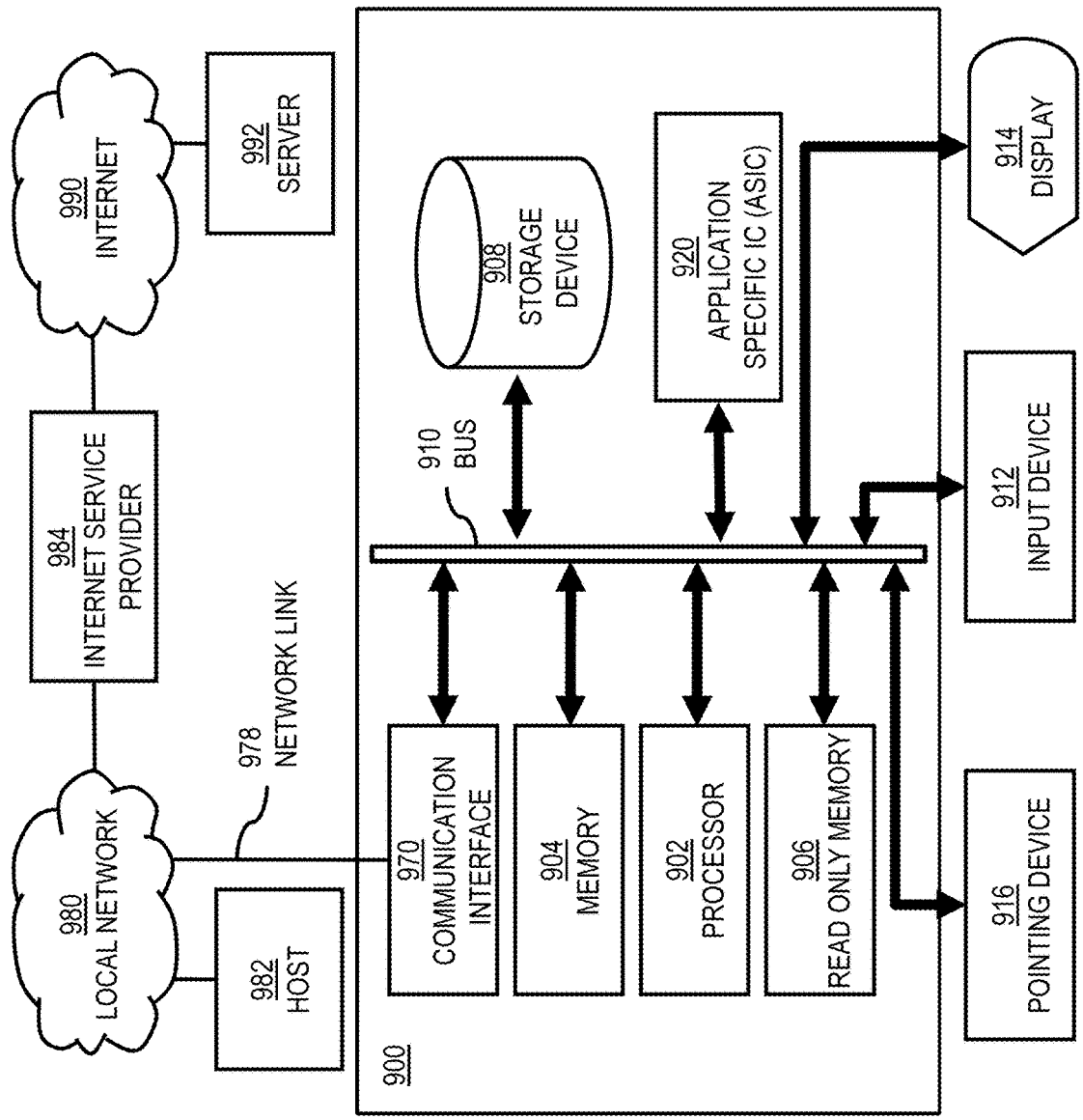
FIG. 9 is a diagram of hardware that can be used to implement an embodiment of the invention, according to example embodiment(s)

FIG. 9 illustrates a computer system 900 upon which an embodiment of the invention may be implemented. Computer system 900 is programmed (e.g., via computer program code or instructions) to automatically detect suspicious device/vehicle presence on non-navigable roads as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to automatically detecting suspicious device/vehicle presence on non-navigable roads. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for automatically detecting suspicious device/vehicle presence on non-navigable roads. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, which is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, which persists even when the computer system 900 is turned off or otherwise loses power.

Information, including instructions for automatically detecting suspicious device/vehicle presence on non-navigable roads, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, which carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 109 for automatically detecting suspicious device/vehicle presence on non-navigable roads.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to automatically detect suspicious device/vehicle presence on non-navigable roads as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to automatically detect suspicious device/vehicle presence on non-navigable roads. The memory 1005 also stores the data associated with or generated by the execution of the inventive steps.

Figure 11:
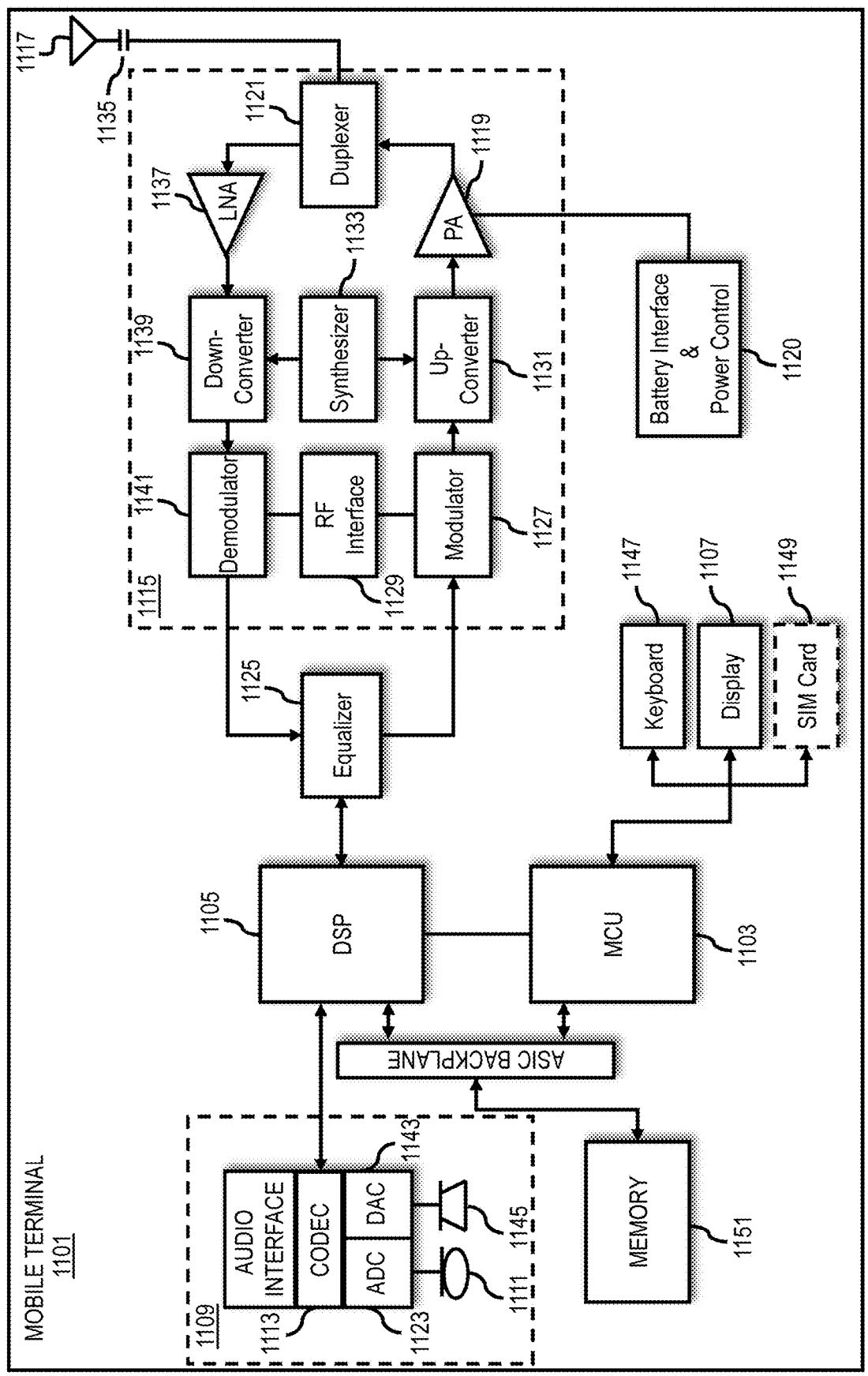
FIG. 11 is a diagram of a mobile terminal that can be used to implement an embodiment of the invention.

FIG. 11 is a diagram of exemplary components of a mobile terminal 1101 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (TMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to automatically detect suspicious device/vehicle presence on non-navigable roads. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving positioning data associated with a vehicle or a device;
   processing the positioning data to determine that a location of the vehicle or the device is on a non-navigable road;
   designating the location on the non-navigable road as a suspicious location;
   providing an alert message based on the suspicious location as an output.

2. The method of claim 1, wherein the non-navigable road is a road that does not exist in a geographic database, a restricted road, or a combination thereof.

3. The method of claim 1, wherein a positioning sensor of the vehicle or the device is inactive, and wherein the positioning data is received based on one or more sensors of at least one other device traveling within proximity of the vehicle or device.

4. The method of claim 3, further comprising: processing sensor data from the one or more sensors of the at least one other device to detect that the vehicle or the device has exited a road at an exit point,
   wherein the designating of the location on the non-navigable road as a suspicious location is based on determining that the exit point is not recorded in a geographic database.

5. The method of claim 4, further comprising:
   determining the exit point with respect to at least one map feature of a geographic database associated with the road.

6. The method of claim 5, wherein the at least one map feature includes one or more pole features, road furniture, or a combination thereof.

7. The method of claim 3, further comprising:
   initiating a confirmation of the suspicious location based on a minimum number of observations of the vehicle or the device at the suspicious location by the at least one other device.

8. The method of claim 1, further comprising:
   initiating a confirmation of the suspicious location based on determining that the location on the non-navigable road is beyond a boundary of a proximate road.

9. The method of claim 8, wherein the confirmation is based on the location on the non-navigable road being a distance threshold beyond the boundary of the proximate road.

10. The method of claim 8, wherein the boundary is a physical barrier, a lane boundary, or a combination thereof of the proximate road.

11. The method of claim 1, further comprising:
    initiating a confirmation of a suspicious location based on determining that a positioning sensor of the vehicle or the device has been manually turned off at the location on the non-navigable road.

12. The method of claim 1, further comprising:
    initiating a dispatch of a drone, an investigative unit, or a combination thereof to the suspicious location based on the alert message.

13. An apparatus comprising:
    at least one processor; and
    at least one memory including computer program code for one or more programs,
    the at least one memory and the computer program code configured to, with the at least one processor, cause the apparatus to perform at least the following:
    receive sensor data from at least one vehicle traveling on a road;
    process the sensor data to detect that another vehicle has exited the road at an exit point;
    designate that the another vehicle is engaged in a suspicious activity based on determining that the exit point is not recorded as an exit in a geographic database; and
    provide an alert message based on the suspicious activity as an output.

14. The apparatus of claim 13, wherein the sensor data includes image data captured by the at least one vehicle.

15. The apparatus of claim 13, wherein the apparatus is further caused to:
    initiate a confirmation of the suspicious activity based on determining that a positioning sensor of the another vehicle is inactive or manually turned off.

16. The apparatus of claim 13, wherein the apparatus is further caused to:
    initiate a confirmation of the suspicious activity based on a minimum number of observations of the another vehicle by the at least one vehicle.

17. A non-transitory computer-readable storage medium carrying one or more sequences of one or more instructions which, when executed by one or more processors, cause an apparatus to perform:
    determining a location at which a vehicle or a device has manually turned off a positioning sensor of the vehicle or the device;
    querying a geographic database to determine that the location is on a non-navigable road;
    designating the location on the non-navigable road as a suspicious location; and
    providing an alert message based on the suspicious location as an output.

18. The non-transitory computer-readable storage medium of claim 17, wherein the apparatus is further caused to perform:
    initiating a confirmation of the suspicious location based on determining that the location on the non-navigable road is beyond a boundary of a proximate road.

19. The non-transitory computer-readable storage medium of claim 18, wherein the confirmation is based on the location on the non-navigable road being a distance threshold beyond the boundary of the proximate road.

20. The non-transitory computer-readable storage medium of claim 18, wherein the boundary is a physical barrier, a lane boundary, or a combination thereof of the proximate road, and wherein the boundary meets a minimum barrier distance threshold.

* * * * *